US012623601B2

(12) United States Patent
Shimizu

(10) Patent No.: US 12,623,601 B2
(45) Date of Patent: May 12, 2026

(54) VIDEO DISPLAY APPARATUS

(71) Applicant: JVCKENWOOD Corporation, Yokohama (JP)

(72) Inventor: Yusuke Shimizu, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/932,680

(22) Filed: Oct. 31, 2024

(65) Prior Publication Data

US 2025/0050810 A1     Feb. 13, 2025

Related U.S. Application Data

(63) Continuation of application No. PCT/JP2023/013943, filed on Apr. 4, 2023.

(30) Foreign Application Priority Data

May 13, 2022 (JP) ................................. 2022-079448
May 13, 2022 (JP) ................................. 2022-079458
May 13, 2022 (JP) ................................. 2022-079484

(51) Int. Cl.
*B60R 1/25* (2022.01)
*G06F 3/04847* (2022.01)
*G06F 3/04883* (2022.01)

(52) U.S. Cl.
CPC ............ *B60R 1/25* (2022.01); *G06F 3/04847* (2013.01); *G06F 3/04883* (2013.01);
(Continued)

(58) Field of Classification Search
CPC . B60R 1/25; B60R 2300/20; B60R 2300/302; B60R 1/00; B60R 1/20;
(Continued)

(56) References Cited

U.S. PATENT DOCUMENTS 6,741,790 B1 * 5/2004 Burgess .............. H04N 5/9201
8,514,101 B2 * 8/2013 Mathieu ................ G02B 27/01
                                                            701/1
(Continued)

FOREIGN PATENT DOCUMENTS

CN         113907789         1/2022
JP        2006-240383        9/2006
(Continued)

OTHER PUBLICATIONS

International Search Report and Written Opinion for International Application Serial No. PCT/JP2023/013943 mailed on Jun. 27, 2023, 11 pages.

*Primary Examiner* — John W Miller
*Assistant Examiner* — Omer Khalid
(74) *Attorney, Agent, or Firm* — Amin, Turocy & Watson, LLP

(57) ABSTRACT

A video display apparatus includes: an imager that captures a video of surroundings of a vehicle; a transparent display panel installed in a window glass of the vehicle; an identification unit that identifies, from the captured video, a visible range where a passenger views an outside as a range displayed on the transparent display panel; an operation unit that is operable on a surface of the transparent display panel; a recording controller that records the captured video in a storage; a replay controller that replays the recorded video; and a display controller that causes the transparent display panel to display a video of the identified range, wherein when operation is started, the replay controller causes the transparent display panel to display a video at a start of the operation, and when an operation direction is along a travelling direction, the replay controller replays, in a reverse direction, the recorded video.

11 Claims, 15 Drawing Sheets

(52) U.S. Cl.
CPC ..... *B60R 2300/20* (2013.01); *B60R 2300/302* (2013.01); *B60R 2300/602* (2013.01)

(58) Field of Classification Search
CPC ............. G06F 3/04847; G06F 3/04883; G06F 3/0484; G07C 5/0866; G11B 27/007; G11B 27/34; H04N 7/183
USPC ......................................................... 348/148
See application file for complete search history.

(56) References Cited

U.S. PATENT DOCUMENTS

| | | | | |
|---|---|---|---|---|
| 9,952,431 | B2 * | 4/2018 | Chen | .................. G02B 27/0149 |
| 2015/0077235 | A1 | 3/2015 | Pisz et al. | |
| 2015/0077237 | A1 | 3/2015 | Chou et al. | |
| 2015/0077272 | A1 | 3/2015 | Pisz et al. | |
| 2015/0077327 | A1 | 3/2015 | Pisz et al. | |
| 2015/0077561 | A1 | 3/2015 | Schulz | |
| 2015/0081133 | A1 | 3/2015 | Schulz | |
| 2015/0081167 | A1 | 3/2015 | Pisz et al. | |
| 2015/0081169 | A1 | 3/2015 | Pisz | |
| 2015/0180999 | A1 | 6/2015 | Pisz | |
| 2016/0176372 | A1 | 6/2016 | Kim | |
| 2023/0127820 | A1 | 4/2023 | Sang et al. | |
| 2023/0160715 | A1 * | 5/2023 | Chang | ................ G01C 21/3647 |
| | | | | 701/439 |

FOREIGN PATENT DOCUMENTS

| | | |
|---|---|---|
| JP | 2015-064675 | 4/2015 |
| JP | 2016-539346 | 12/2016 |
| JP | 2020-078083 | 5/2020 |

* cited by examiner

Figure 1:
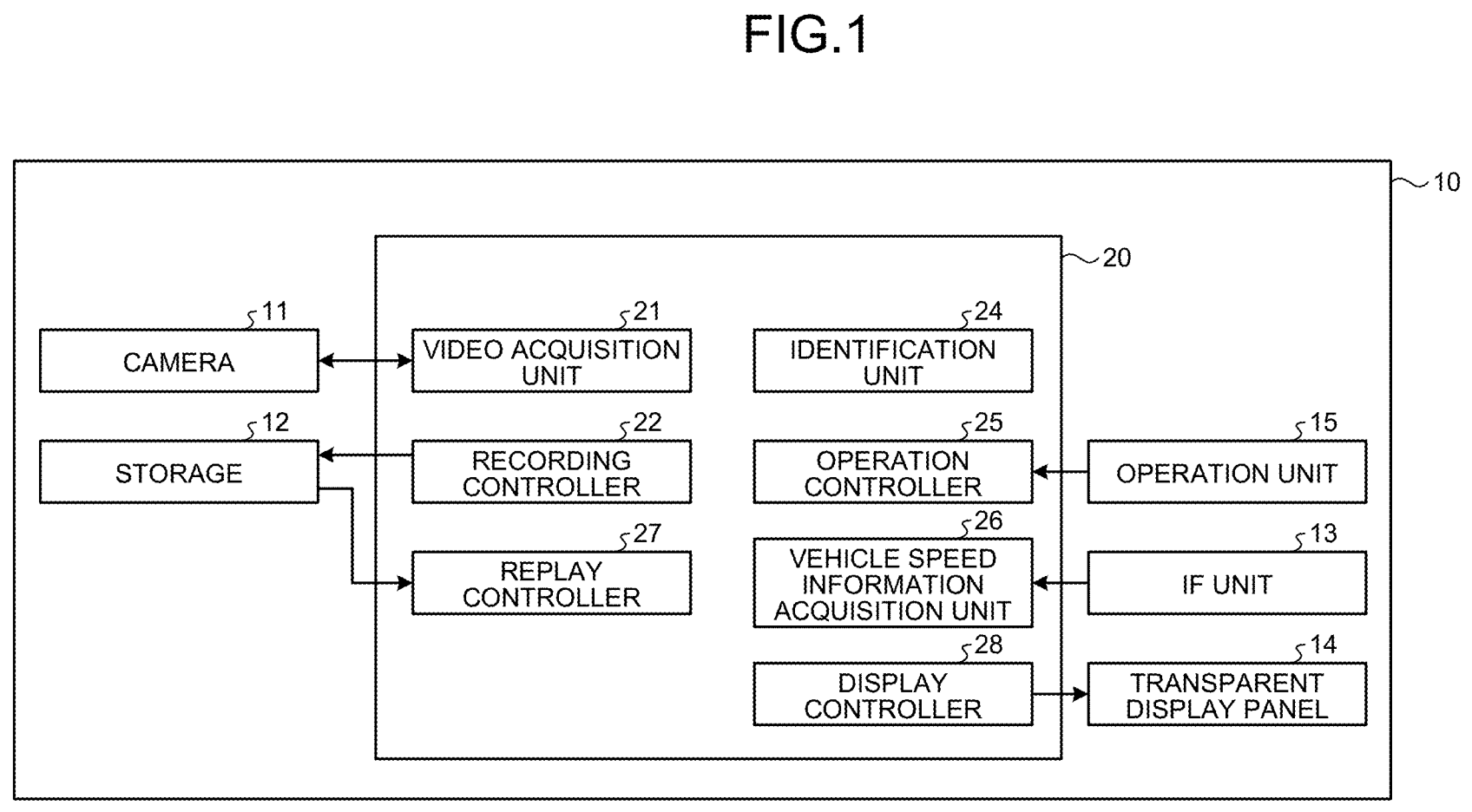

21 VIDEO ACQUISITION UNIT

22 RECORDING CONTROLLER

27 REPLAY CONTROLLER

24 IDENTIFICATION UNIT

25 OPERATION CONTROLLER

26 VEHICLE SPEED INFORMATION ACQUISITION UNIT

28 DISPLAY CONTROLLER

11 CAMERA

12 STORAGE

15 OPERATION UNIT

13 IF UNIT

14 TRANSPARENT DISPLAY PANEL

FRONT OF VEHICLE
(TRAVELLING DIRECTION)

FRONT OF VEHICLE
(TRAVELLING DIRECTION)

FRONT OF VEHICLE
(TRAVELLING DIRECTION)

FRONT OF VEHICLE
(TRAVELLING DIRECTION)

FIG.18

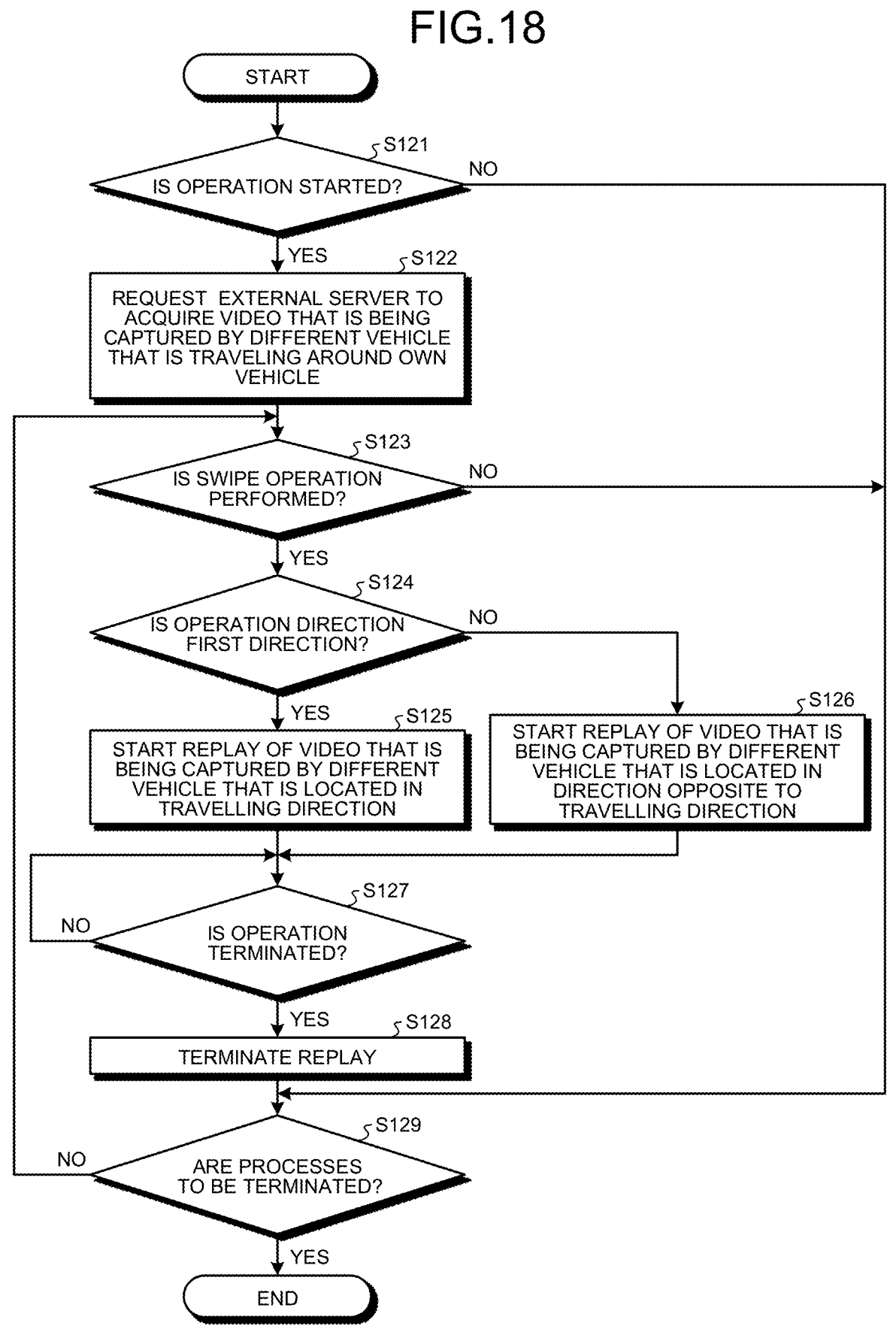

START

S121
IS OPERATION STARTED? — NO

YES

S122
REQUEST EXTERNAL SERVER TO ACQUIRE VIDEO THAT IS BEING CAPTURED BY DIFFERENT VEHICLE THAT IS TRAVELING AROUND OWN VEHICLE

S123
IS SWIPE OPERATION PERFORMED? — NO

YES

S124
IS OPERATION DIRECTION FIRST DIRECTION? — NO

YES

S125
START REPLAY OF VIDEO THAT IS BEING CAPTURED BY DIFFERENT VEHICLE THAT IS LOCATED IN TRAVELLING DIRECTION

S126
START REPLAY OF VIDEO THAT IS BEING CAPTURED BY DIFFERENT VEHICLE THAT IS LOCATED IN DIRECTION OPPOSITE TO TRAVELLING DIRECTION

S127
IS OPERATION TERMINATED? — NO

YES

S128
TERMINATE REPLAY

S129
ARE PROCESSES TO BE TERMINATED? — NO

YES

END

1

VIDEO DISPLAY APPARATUS

CROSS-REFERENCE TO RELATED APPLICATIONS

This application is a Continuation of PCT International Application No. PCT/JP2023/013943 filed on Apr. 4, 2023 which claims the benefit of priority from Japanese Patent Applications No. 2022-079448, No. 2022-079458, and No. 2022-079484, all filed on May 13, 2022, the entire contents of all of which are incorporated herein by reference.

FIELD OF THE INVENTION

The present application relates to a video display apparatus.

BACKGROUND OF THE INVENTION

A system that captures a video around a vehicle is put into practical use, and is used as, for example, a drive recorder. A video that is captured by the system as described above is temporarily recorded and thereafter overwritten with a new video unless the video is stored by event recording or the like. A technology for performing forward replay or reverse replay of a video by performing flick operation on a screen with reference to a vanishing point that serves as a reference point in the video of the drive recorder has been disclosed (for example, see Japanese Laid-open Patent Publication No. 2020-078083).

In the technology disclosed in Japanese Laid-open Patent Publication No. 2020-078083, when a passenger of a vehicle is viewing surroundings of the vehicle while the vehicle is travelling, it is difficult to immediately check a video of a location that is passed by the vehicle by travelling.

SUMMARY OF THE INVENTION

A video display apparatus is disclosed.

According to one aspect of the present application, there is provided a video display apparatus comprising: an imager configured to capture a video of surroundings of a moving object; a transparent display panel that is installed in a window glass of the moving object and that has transparency; an identification unit configured to identify, from the video that is captured by the imager, a visible range in which a passenger views an outside of the moving object through the window glass as a range that is to be displayed on the transparent display panel; an operation unit configured to be operable on a surface of the transparent display panel; a recording controller configured to record the video that is captured by the imager in a storage; a replay controller configured to replay the video that is recorded in the storage; and a display controller configured to cause the transparent display panel to display a video of the range that is identified by the identification unit in the video that is replayed by the replay controller, wherein when operation of the operation unit is started, the replay controller is further configured to cause the transparent display panel to display a video that is obtained at a start of the operation of the operation unit, and when the operation unit is operated such that an operation direction of the operation unit is along a travelling direction of the moving object, the replay controller is further configured to replay, in a reverse direction, the video that is recorded by the recording controller from the video that is obtained at the start of the operation of the operation unit.

According to one aspect of the present application, there is provided a video display apparatus comprising: a video acquisition unit configured to acquire a video that includes location information on a location at which the video is captured; a location information acquisition unit configured to acquire location information on a moving object; a transparent display panel that is installed in a window glass of the moving object and that has transparency; an operation unit configured to be operable on a surface of the transparent display panel; an identification unit configured to identify, from the video that is acquired by the video acquisition unit, a visible range in which a passenger views an outside of the moving object through the window glass as a range that is to be displayed on the transparent display panel; a replay controller configured to replay the video that is acquired by the video acquisition unit; and a display controller configured to cause the transparent display panel to display a video of the range that is identified by the identification unit in the video that is replayed by the replay controller, wherein when operation of the operation unit is started, the replay controller is further configured to cause the transparent display panel to display a video that was captured in a past at a same location as a location of the moving object at the start of the operation of the operation unit and that is acquired by the video acquisition unit and, when the operation unit is operated such that an operation direction of the operation unit is in a first direction along a travelling direction of the moving object, the replay controller is further configured to replay the video in a forward direction, and when the operation unit is operated such that the operation direction of the operation unit is along a direction opposite to the first direction along the travelling direction of the moving object, the replay controller is further configured to replay the video in a reverse direction.

According to one aspect of the present application, there is provided a video display apparatus comprising: a location information acquisition unit configured to acquire location information on a moving object; a transparent display panel that is installed in a window glass of the moving object and that has transparency; a video acquisition unit configured to acquire, from a different moving object that is travelling around the moving object, a video in which surroundings of the different moving object are captured and which includes location information; an identification unit configured to identify, from the video that is acquired by the video acquisition unit, a visible range in which a passenger views an outside of the moving object through the window glass as a range that is to be displayed on the transparent display panel; an operation unit configured to be operable on a surface of the transparent display panel; a replay controller configured to replay the video that is acquired by the video acquisition unit; and a display controller configured to cause the transparent display panel to display a video of the range that is identified by the identification unit in the video that is replayed by the replay controller, wherein when operation of the operation unit is started, the video acquisition unit is further configured to start to acquire a video that is being captured by the different moving object that is travelling around the moving object, when the operation unit is operated such that an operation direction of the operation unit is operated in a first direction along a travelling direction of the moving object, the replay controller is further configured to replay the video that is being captured by the different moving object located in the travelling direction of the moving object, and when the operation unit is operated such that the operation direction of the operation unit is along a direction opposite to the first direction along the travelling direction of the moving object, the replay controller is further configured to replay the video that is being captured by the different moving object located in the direction opposite to the travelling direction of the moving object.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration example of a video display apparatus according to a first embodiment;

FIG. 18 is a flowchart illustrating an example of a flow of processes in a controller according to the fourth embodiment;

DETAILED DESCRIPTION OF THE INVENTION

Figure 2:
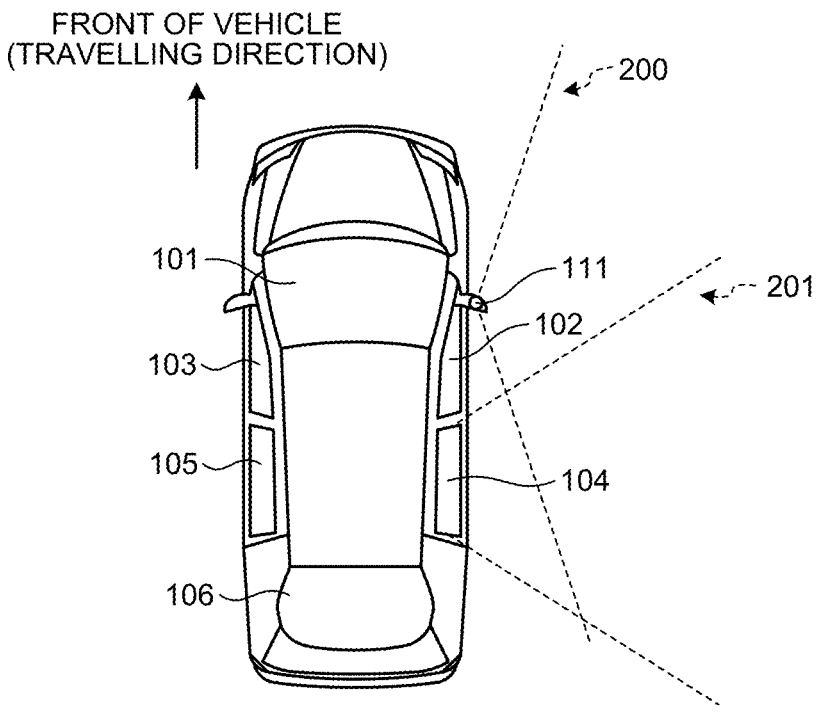
FIG. 2 is a schematic diagram for explaining an example of an imaging angle of view of a window glass of a vehicle.

Embodiments of a video display apparatus according to the present disclosure will be described in detail below with reference to the accompanying drawings. The present invention is not limited by the embodiments below.

First Embodiment

Video Display Apparatus

FIG. 1 is a block diagram illustrating a configuration example of a video display controller (hereinafter, referred to as a "controller") 20 according to a first embodiment.

The first embodiment addresses an issue that, when a passenger of a moving object is viewing surroundings of the moving object while the moving object is moving, it is difficult to immediately check a situation, a facility, or the like in a location that is passed by the moving object by moving. An object of the present embodiment is to allow the passenger of the moving object to immediately check a situation, a facility, or the like in a location that is passed by the moving object by moving.

A video display apparatus 10 replays a video of surroundings of a moving object such as a vehicle, a ship, or a train, and displays the video on a transparent display panel 14 that is arranged in the moving object, for example. In the present embodiment, the video display apparatus 10 replays a video of surroundings of the vehicle in a reverse direction, and displays the video on the transparent display panel 14 that is arranged in the vehicle. In each of the embodiments described below, an explanation will be given by using a vehicle as an example of the moving object.

Replay in the reverse direction indicates replay of a video in a direction opposite to a direction along a timeline, that is, replay in a rewind direction.

The video display apparatus 10 may be an apparatus that is portable and available in a vehicle, in addition to an apparatus that is mounted on a vehicle. Further, the video display apparatus 10 may be implemented so as to include a function or a configuration of a device that is installed in advance in the vehicle or a navigation device or the like. The video display apparatus 10 includes a camera 11, a storage 12, an interface unit (hereinafter, described as an "IF unit") 13, a transparent display panel 14, an operation unit 15, and a controller 20.

The camera 11 is a camera that captures a video of surroundings of a vehicle. Examples of the camera 11 include a camera that is unique to the video display apparatus 10 and a camera that is for a bird's-eye view video and that is shared with a bird's-eye view video display system. The camera 11 may be a group of multiple of cameras. The camera 11 is arranged at a position at which it is possible to capture videos of a front of the vehicle, a right side of the vehicle, a left side of the vehicle, and a rear of the vehicle, for example. The camera 11 may be arranged for each of the transparent display panels 14, and may capture a scene that is viewed through the transparent display panel 14, for example. In other words, the camera 11 is a camera that is able to capture a video in a direction that corresponds to the transparent display panel 14 to which the present invention is applicable. The camera 11 may be arranged in accordance with each of window glasses of a vehicle, and capture scene that is viewed through each of the window glasses, for example. In the present embodiment, the camera 11 continuously capture a video while an accessory power supply is turned on or while the vehicle is operating. The camera 11 outputs the captured video to a video acquisition unit 21 of the controller 20. The video is, for example, a moving image that is formed of images at 27.5 frames per second.

FIG. 2 is a schematic diagram for explaining an example of an imaging angle of view of a window glass of a vehicle. As one example, an imaging angle of view 200 of a right camera 111 that captures a video of a right side among the multiple cameras included in the camera 11 will be described. The right camera 111 that captures a video of the right side is arranged on a right side mirror, for example. The imaging angle of view 200 of the right camera 111 that captures a video of the right side includes a visible range 201 in which a passenger is able to view an outside of the vehicle through a right rear door window glass 104.

The storage 12 is used to temporarily store therein data of the video display apparatus 10. The storage 12 is, for example, a semiconductor memory device, such as a Random Access Memory (RAM) or a flash memory, or a recording unit, such as a memory card. Alternatively, the storage 12 may be an external recording unit that is connected by wireless communication via a communication apparatus (not illustrated). The storage 12 records a loop recording video based on a control signal that is output from a recording controller 22 of the controller 20. The loop recording video is a video that is obtained by loop recording, and the loop recording will be described later.

The IF unit 13 is an interface for acquiring vehicle speed information on a vehicle via a Controller Area Network (CAN) or the like.

Examples of the transparent display panel 14 include a display device that is unique to the video display apparatus 10 and a display device that is shared with a different system including a navigation system. As the transparent display panel 14, for example, a transparent organic Electro Luminescence (EL) display is appropriate, but embodiments are not limited to this example, and it may be possible to adopt a different system. The transparent display panel 14 is installed on a periphery of the vehicle, that is, on an outer peripheral portion of the vehicle, and has transparency while a video is not displayed. The transparent display panel 14 displays a video of surroundings of the vehicle. The transparent display panel 14 displays a video based on a video signal that is output from a display controller 28 of the controller 20. The transparent display panel 14 displays a video that is captured by the camera 11 or a video that is recorded in the storage 12.

The transparent display panel 14 is included in a window glass of the vehicle or constitutes the window glass of the vehicle. The transparent display panel 14 has, for example, transmittance of 60% or more in a visible light region while a video is not displayed. The transparent display panel 14, while a video is displayed, has transmittance of less than 20% or does not have transmittance in a range in which the video is displayed, for example.

The transparent display panel 14 is applicable to a window through which an outside of the vehicle is visible. The transparent display panel 14 may be applied to at least any of a front window 101, a right front door window glass 102, a left front door window glass 103, the right rear door window glass 104, a left rear door window glass 105, and a rear window 106 of the vehicle that are illustrated in FIG. 2, for example. In the following description, explanation will be given based on the assumption that the transparent display panel 14 is applied to the right rear door window glass 104 of the vehicle.

Figure 3:
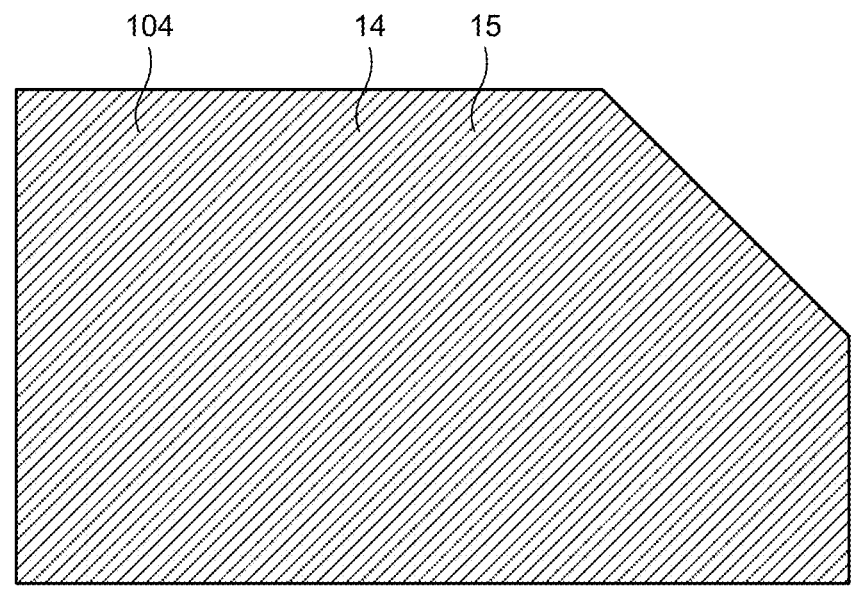
FIG. 3 is a schematic diagram for explaining an example of a rear door window.
Figure 4:
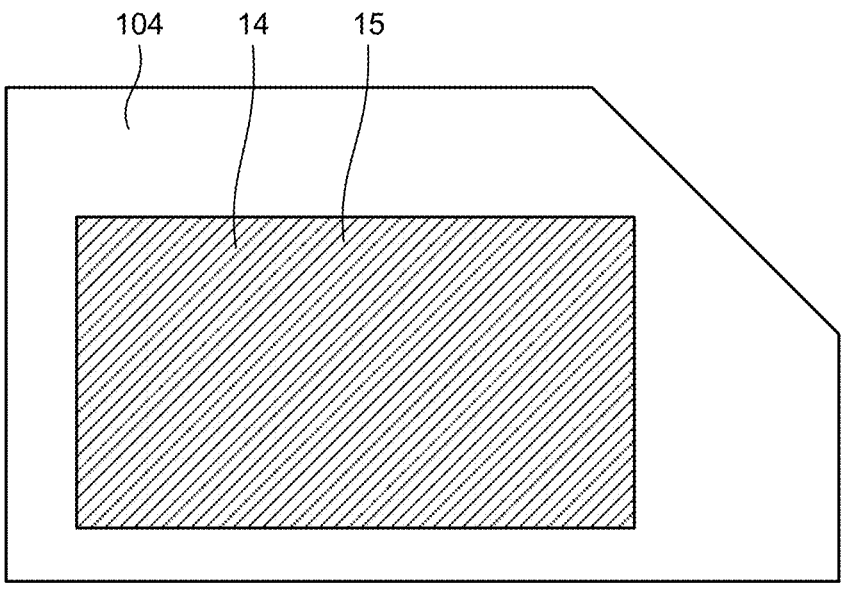
FIG. 4 is a schematic diagram for explaining another example of the rear door window.

FIG. 3 is a schematic diagram for explaining an example of the rear door window. FIG. 4 is a schematic diagram for explaining another example of the rear door window. A touch panel shape that serves as the transparent display panel 14 and the operation unit 15 may be the same as the entire surface shape of a window glass to be applied, or may be formed in a smaller rectangle than the entire surface shape of the window glass to be applied. In the example illustrated in FIG. 3, the touch panel shape that serves as the transparent display panel 14 and the operation unit 15 is the same as the entire surface shape of the right rear door window glass 104. In the example illustrated in FIG. 4, the touch panel shape that serves as the transparent display panel 14 and the operation unit 15 is a smaller rectangle than the entire surface shape of the right rear door window glass 104.

The operation unit 15 is able to receive various kinds of operations on the video display apparatus 10. The operation unit 15 is operable on a surface of the transparent display panel 14. The operation unit 15 is a touch panel that is arranged on, for example, a display screen of the transparent display panel 14 in an overlapping manner. For example, the operation unit 15 is able to receive, similarly to a screen of a smartphone, various kinds of operation such as touch operation, swipe operation, and flick operation, on the touch panel. For example, the operation unit 15 is able to receive operation of replaying a video that is recorded in the storage 12. The operation unit 15 outputs operation information to an operation controller 25 of the controller 20.
Controller The controller 20 is an arithmetic processing device (controller) that includes, for example, a Central Processing Unit (CPU) or the like. The controller 20 loads a stored program and executes a command that is included in the program. The controller 20 includes an internal memory (not illustrated), and the internal memory is used to temporarily store therein data of the controller 20. The controller 20 includes, as functions that are implemented by the configuration and the program, the video acquisition unit 21, the recording controller 22, an identification unit 24, the operation controller 25, a vehicle speed information acquisition unit 26, a replay controller 27, and the display controller 28.

The video acquisition unit 21 acquires a video of surroundings that are captured by the camera 11 that captures an image of surroundings of the vehicle. The video acquisition unit 21 may function as an imaging controller that controls imaging operation of the camera 11.

The recording controller 22 records, in the storage 12, a video that is captured by the camera 11. The recording controller 22 performs control of recording a video that is acquired by the video acquisition unit 21 in the storage 12. The recording controller 22 records, as an overwritable video, the video that is acquired by the video acquisition unit 21 in the storage 12 during a period in which the vehicle is operating, such as a period in which an accessory power supply is turned on. More specifically, the recording controller 22 performs loop recording in which videos that are acquired by the video acquisition unit 21 are continuously recorded in the storage 12, and when the capacity of the storage 12 is full, a new video is recorded by overwriting an old video. It is sufficient for the recording controller 22 to record captured videos for a certain time that is needed for replay in the reverse direction. For example, it is sufficient to perform loop recording on videos for about 5 minutes to 10 minutes. A time in which the loop recording is available is determined based on a recordable capacity of the storage 12. When the cameras 11 are provided on the left and right sides for example, the recording controller 22 performs loop recording on each of videos.

The identification unit 24 identifies, from a video that is based on the angle of view of the camera 11, a range that is determined in advance as an identified range that is to be displayed on the transparent display panel 14. The identification unit 24 identifies a range in which a passenger who is sitting on a seat that is the closest to a window glass of the vehicle can view an outside of the vehicle through the window glass from an average position of a face (eyes) of the passenger. For example, in the case of the right rear door window glass 104, the identification unit 24 identifies a range in which a passenger who is sitting on a right rear seat can view the outside of the vehicle through the right rear door window glass 104 from an average position of a face (eyes) of the passenger.

The identification unit 24 may detect a position and an orientation of the face and a position and an orientation of the eyes of the passenger from a video that is captured by an in-vehicle camera (not illustrated), and change the identified range in accordance with the position and the orientation of the eyes. The identification unit 24 may detect a position and an orientation of the face and a position and an orientation of the eyes of the passenger at a start of the operation of the operation unit 15, identify a range at the start of the operation of the operation unit 15, and display a video of the identified range while the operation unit 15 is operating.

Figure 5:
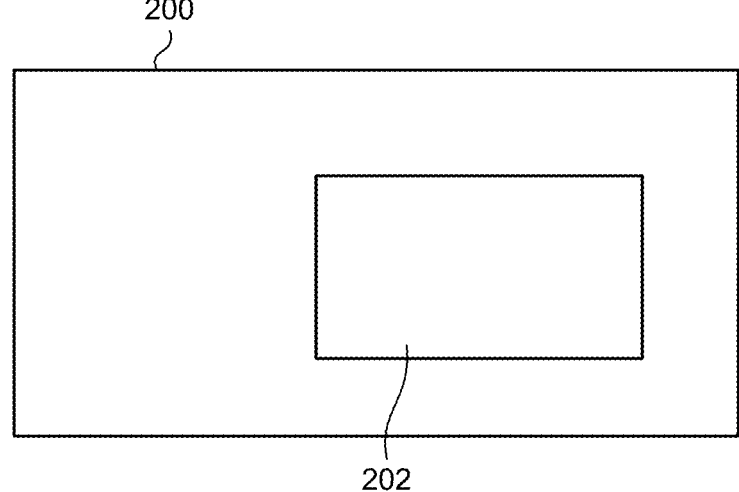
FIG. 5 is a schematic diagram for explaining an imaging angle of view and an identified range.

FIG. 5 is a schematic diagram for explaining the imaging angle of view of the camera 11 and the identified range that is identified by the identification unit 24. The identification unit 24 identifies an identified range 202 that is to be displayed on the transparent display panel 14 in a video 200 that is captured by the camera 11. The identification unit 24 identifies the identified range 202 in accordance with the shape of the transparent display panel 14. For example, when the transparent display panel 14 has the shape as illustrated in FIG. 3, the identification unit 24 identifies the identified range 202 that has the same shape as the entire surface shape of the window glass to be applied. For example, when the transparent display panel 14 has the shape as illustrated in FIG. 4, the identification unit 24 identifies an identified range 202 that has a rectangular shape.

The operation controller 25 acquires operation information on operation that is received by the operation unit 15. The operation controller 25 acquires, for example, operation information that indicates various kinds of operation such as touch operation, swipe operation, and flick operation, on a touch panel, and outputs a control signal. The operation controller 25 acquires, for example, operation along the travelling direction, and outputs a control signal that indicates operation information.

The operation along the travelling direction of the vehicle is operation in one of a forward direction or a backward direction of the vehicle. For example, the operation indicates swipe operation from front to back or from back to front, like operation on a seek bar that indicates a replay position at a time of replaying a video. Therefore, with respect to the rear door window glass that is arranged on a side surface of the vehicle, operation in a left-right direction when viewed from inside of the room of the vehicle corresponds to the operation along the travelling direction of the vehicle.

Figure 6:
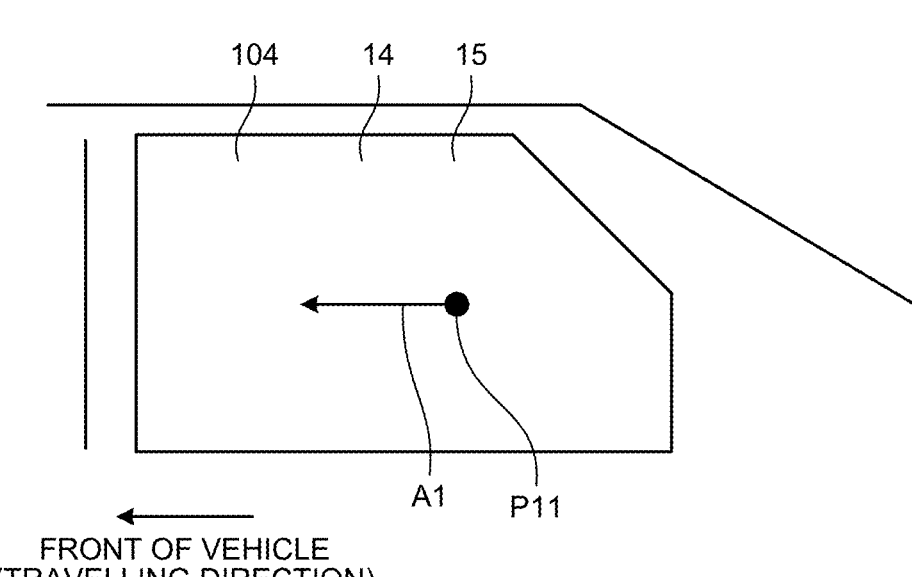
FIG. 6 is a schematic diagram for explaining an example of operation in an operation unit in the first embodiment.

FIG. 6 is a schematic diagram for explaining an example of operation in the operation unit in the first embodiment. FIG. 6 illustrates the right rear door window glass 104 as one example. When, for example, a passenger performs touch operation as in a screen of a smartphone, the operation controller 25 outputs a control signal that indicates touch operation at an operation start point P11. For example, when a user performs swipe operation as in a screen of a smartphone, the operation controller 25 outputs a control signal that indicates swipe operation from back to front as indicated by an arrow A1.

It is assumed that the travelling direction of the vehicle is basically a forward direction. The present invention is not applied when the vehicle travels backward. Therefore, it is not needed to detect the travelling direction of the vehicle. In the case of the transparent display panel 14 that is arranged on the right rear door window glass 104 of the vehicle, for example, the travelling direction is set, in advance, to a leftward direction when the transparent display panel 14 is viewed from the inside of the room of the vehicle. In the case of the transparent display panel 14 that is arranged on the left rear door window glass 105 of the vehicle, for example, the travelling direction is set, in advance, to a rightward direction when the transparent display panel 14 is viewed from the inside of the room of the vehicle.

The vehicle speed information acquisition unit 26 acquires vehicle speed information that indicates a vehicle speed of the vehicle via a CAN or the like. The vehicle speed information acquisition unit 26 need not always be included in the controller 20.

The replay controller 27 controls replay of a video. The replay controller 27 controls replay of a video that is recorded in the storage 12. The replay controller 27 controls replay of a loop recording video that is recorded in the storage 12, based on the control signal that is output from the operation controller 25.

The replay controller 27 controls replay of a video in the reverse direction, based on the control signal that is output from the operation controller 25. The replay controller 27 causes the transparent display panel 14 to display a video at the start of the operation of the operation unit when the operation of the operation unit 15 is started, and replay, in the reverse direction, the video that is recorded in the recording controller 22 from the video at the start of the operation of the operation unit 15 when the operation unit 15 is operated such that the operation direction of the operation unit 15 is along the travelling direction of the vehicle. When touch operation is performed on the transparent display panel 14, the replay controller 27 displays a video, in a suspended manner, at the time of the touch operation, and thereafter, when swipe operation or the like is performed on the transparent display panel 14, the replay controller 27 controls replay of the displayed video in the reverse direction.

The replay controller 27 may control real-time replay of a video that is being captured by the camera 11. More specifically, when the operation of the operation unit 15 is started, the replay controller 27 may cause the transparent display panel 14 to display a video that is being captured from the start of the operation of the operation unit 15, and, when the operation unit 15 is operated such that the operation direction of the operation unit 15 is along the travelling direction of the vehicle, the replay controller 27 may control replay of the video that is recorded in the recording controller 22 in the reverse direction. When touch operation is performed on the transparent display panel 14, the replay controller 27 controls switch to a video that is being captured by the touch operation, and thereafter, when swipe operation or the like is performed on the transparent display panel 14, the replay controller 27 controls replay of the displayed video in the reverse direction.

The replay controller 27 may change a speed of replay of the video in the reverse direction based on an operation speed when the operation unit 15 is operated such that the operation direction of the operation unit 15 is along the travelling direction of the vehicle. In the present embodiment, the replay controller 27 changes a speed of replay in the reverse direction based on an operation amount of the swipe operation per unit time, in other words, the operation speed. For example, in a case of the operation speed of about 100 mm/sec, the replay controller 27 performs replay in the reverse direction at 1× speed. For example, in a case of the operation speed of about 50 mm/sec, the replay controller 27 performs replay in the reverse direction at 0.5× speed. For example, in a case of the operation speed of about 200 mm/sec, the replay controller 27 performs replay in the reverse direction at 2× speed. The operation speed and the replay speed may be associated with each other in a linear manner or may be associated with each other in a stepwise manner.

The replay controller 27 may change the speed of replay of the video in the reverse direction based on a travel speed of the vehicle at the start of the operation of the operation unit 15. More specifically, the replay controller 27 may change the speed of replay of the video in the reverse direction in accordance with the travel speed of the vehicle at the start of the operation of the operation unit 15, based on the vehicle speed information that is acquired by the vehicle speed information acquisition unit 26. For example, when the travel speed of the vehicle at the start of the operation of the operation unit 15 is equal to or larger than 0 km/h and smaller than 20 km/h, the replay controller 27 performs replay in the reverse direction at 0.5× speed. When the travel speed of the vehicle at the start of the operation of the operation unit 15 is equal to or larger than 20 km/h and smaller than 60 km/h, the replay controller 27 performs replay in the reverse direction at 1× speed. When the travel speed of the vehicle at the start of the operation of the operation unit 15 is equal to or larger than 60 km/h, the replay controller 27 performs replay in the reverse direction at 2× speed. The travel speed of the vehicle and the replay speed may be associated with each other in a linear manner or may be associated with each other in a stepwise manner.

The display controller 28 causes the transparent display panel 14 to display a video in the range that is identified by the identification unit 24 in the video that is replayed by the replay controller 27.

The display controller 28 controls display of a video on the transparent display panel 14. The display controller 28 outputs a video signal that causes the transparent display panel 14 to output a video based on a control signal from the replay controller 27. More specifically, the display controller 28 outputs a video signal that is to be displayed by replaying a video that is being captured by the camera 11 or by replaying a video that is recorded in the storage 12.

Information Processing by Controller

Figure 7:
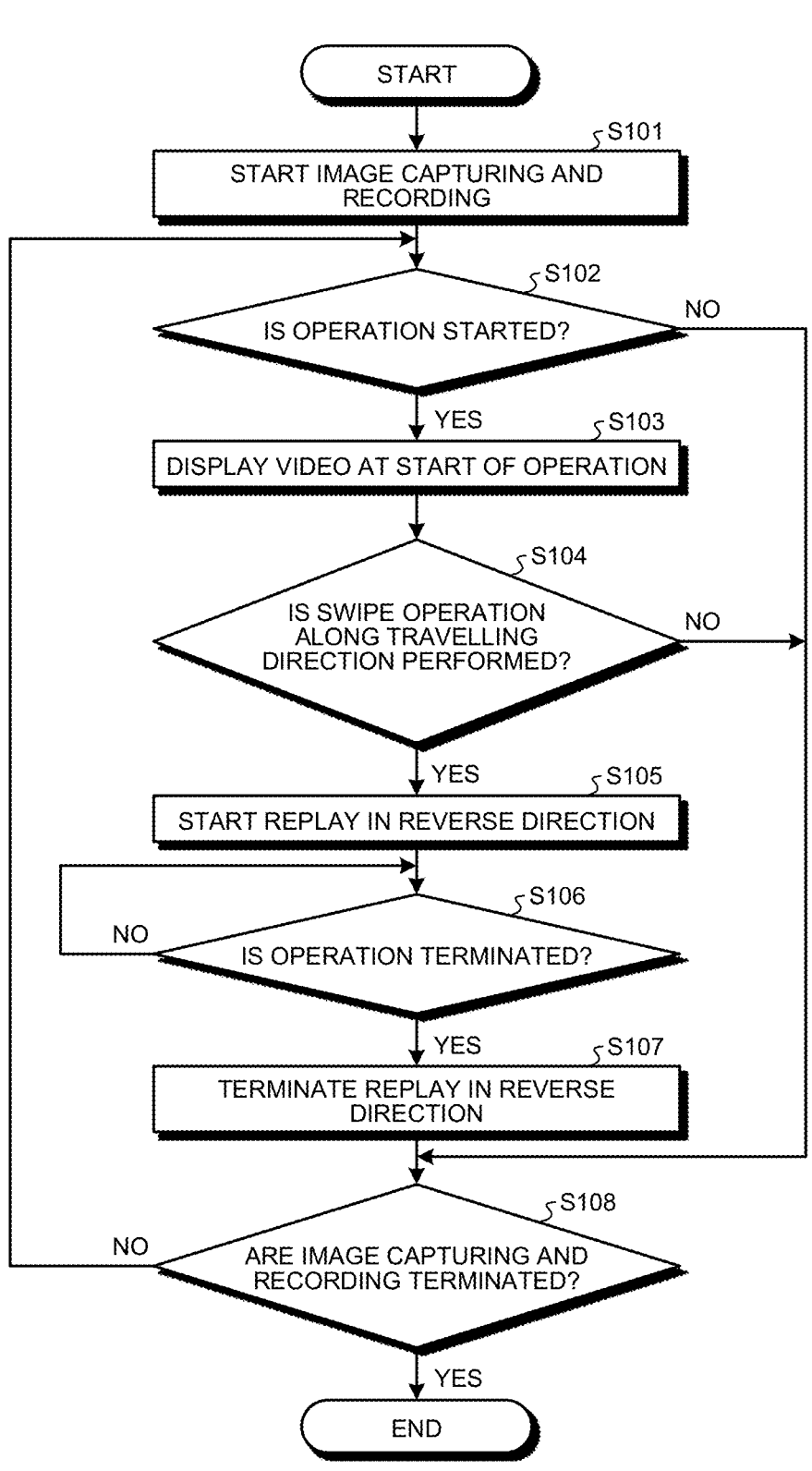
FIG. 7 is a flowchart illustrating an example of a flow of processes in a video display apparatus according to the first embodiment.

A flow of processes performed by the controller 20 will be described below with reference to FIG. 7. While the video display apparatus 10 is activated, the process in the flow-chart illustrated in FIG. 7 is performed.

The controller 20 starts image capturing and recording (Step S101). More specifically, the video display apparatus 10 causes the camera 11 to start capturing a video of surroundings of the vehicle. Further, the controller 20 causes the video acquisition unit 21 to acquire the video of surroundings of the vehicle captured by the camera 11. Furthermore, the controller 20 causes the recording controller 22 to perform loop recording on the video that is captured by the camera 11 in the storage 12. The controller 20 goes to Step S102.

The controller 20 determines whether or not operation is started (Step S102). More specifically, the controller 20 causes the operation controller 25 to determine that the operation is started when touch operation on the operation unit 15 is received. When the operation controller 25 determines that the operation is started (Yes at Step S102), the controller 20 goes to Step S103. When the operation controller 25 does not determine that the operation is started (No at Step S102), the controller 20 goes to Step S108.

When it is determined that the operation is started (Yes at Step S102), the controller 20 displays a video at the start of the operation (Step S103). More specifically, the controller 20 causes the identification unit 24 to identify, from the video that is based on the angle of view of the camera 11, a range that is determined in advance as a range that is to be displayed on the transparent display panel 14. The controller 20 causes the replay controller 27 to replay a video at the start of the touch operation on the operation unit 15. The controller 20 causes the display controller 28 to display, on the transparent display panel 14, the video at the start of the touch operation on the operation unit 15, based on a control signal from the replay controller 27. The controller 20 goes to Step S104.

The controller 20 determines whether or not swipe operation along the travelling direction is performed (Step S104). More specifically, the controller 20 causes the operation controller 25 to determine that the swipe operation along the travelling direction is performed when the swipe operation along the travelling direction of the vehicle on the operation unit 15 is received. When the operation controller 25 determines that the swipe operation along the travelling direction is performed (Yes at Step S104), the controller 20 goes to Step S105. When the operation controller 25 does not determine that the swipe operation along the travelling direction is started (No at Step S104), the controller 20 goes to Step S108.

When it is determined that the swipe operation along the travelling direction is performed (Yes at Step S104), replay of the video in the reverse direction is started (Step S105). More specifically, the controller 20 causes the replay controller 27 to replay the video that is recorded in the recording controller 22 in the reverse direction from the video that is obtained at the start of the operation of the operation unit 15. The controller 20 causes the display controller 28 to display the replayed video on the transparent display panel 14 based on a control signal from the replay controller 27. The controller 20 goes to Step S106.

The controller 20 determines whether or not the operation is terminated (Step S106). More specifically, the controller 20 causes the operation controller 25 to determine that the operation is terminated when a finger of the passenger is separated from the operation unit 15 for the swipe operation that is started at Step S104. When the operation controller 25 determines that the operation is terminated (Yes at Step S106), the controller 20 goes to Step S107. When the operation controller 25 does not determine that the operation is terminated (No at Step S106), the controller 20 performs the process at Step S106 again.

When it is determined that the operation is terminated (Yes at Step S106), the controller 20 terminates the replay in the reverse direction (Step S107). More specifically, the controller 20 causes the replay controller 27 to terminate the replay of the video in the reverse direction. The controller 20 causes the display controller 28 to terminate display of the video on the transparent display panel 14 based on a control signal from the replay controller 27. The controller 20 goes to Step S108.

The controller 20 determines whether or not to terminate image capturing and recording (Step S108). For example, it is determined that the image capturing and the recording are to be terminated based on the fact that a power supply or power of the vehicle is turned off or the fact that termination operation is performed on the operation unit 15. When it is determined that the image capturing and the recording are to be terminated (Yes at Step S108), the controller 20 terminates the processes. When it is not determined that the image capturing and the recording are not terminated (No at Step S108), the controller 20 performs the process at Step S102 again.

Figure 8:
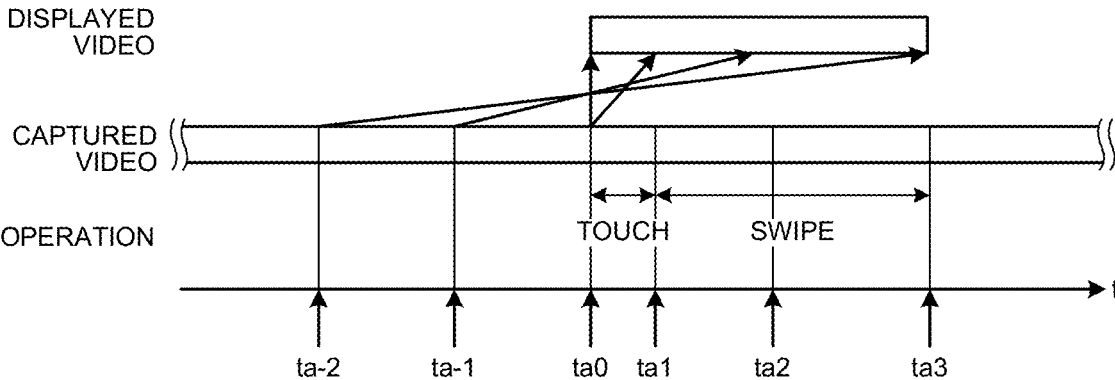
FIG. 8 is a diagram illustrating an example of a relationship between operation and a displayed video in the first embodiment.

FIG. 8 is a diagram illustrating an example of a relationship between operation and a displayed video in the first embodiment. FIG. 8 indicates that time goes in a rightward direction. In the recording controller 22, videos are recorded before a time ta-2 at a time ta0 at which the touch operation is detected. Further, even at the time ta0, the camera 11 continues to capture images. In the example illustrated in FIG. 8, a state is illustrated in which the passenger starts touch operation at the time ta0 and does not move a finger that is performing the touch operation until a time ta1. The replay controller 27 replays a video at the time ta0 as a still image during a period from the time ta1 to the time ta1, and the display controller 28 displays the replayed video on the transparent display panel 14.

Thereafter, the passenger performs swipe operation in the travelling direction of the vehicle from the time ta1 to a time ta3. The replay controller 27 performs replay in the reverse direction from the video at the time ta0, and replays a video from the time ta0 to the time ta-2, which is the same duration from the time ta1 to the time ta3, in the reverse direction. A time ta2 indicates a time in a middle of the swipe operation. In the replay in the reverse direction, a portion that corresponds to the time ta2 is a portion at a time ta-1.

At the time ta3 at which the swipe operation is terminated, the replay controller 27 terminates the replay and the display controller 28 terminates the display of the video. By termination of the display of the video, the transparent display panel 14 enters a transparent state.

After the finger is separated from the operation unit 15 at the time ta3 at which the swipe operation is terminated, the replay controller 27 may continue the replay in the reverse direction for about one second, and thereafter the display controller 28 may terminate the display of the video, for example.

At the time ta3 at which the swipe operation is terminated, the display controller 28 may display the video that is obtained at the time ta-2 as a still image for about one second, and thereafter the display controller 28 may terminate the display of the video, for example.

When the swipe operation is performed again in the same direction after the time ta3, the replay controller 27 further performs replay in the reverse direction from the time ta-2.

A case will be described with reference to FIG. 8 in which a speed of replay in the reverse direction is changed based on an operation speed of the swipe operation. For example, when replay in the reverse direction is performed at 0.5× speed, the video up to the time ta-1 is replayed at the time ta3. For example, when replay in the reverse direction is performed at 2× speed, the video before the time ta-2 is replayed at the time ta3.

Figure 9:
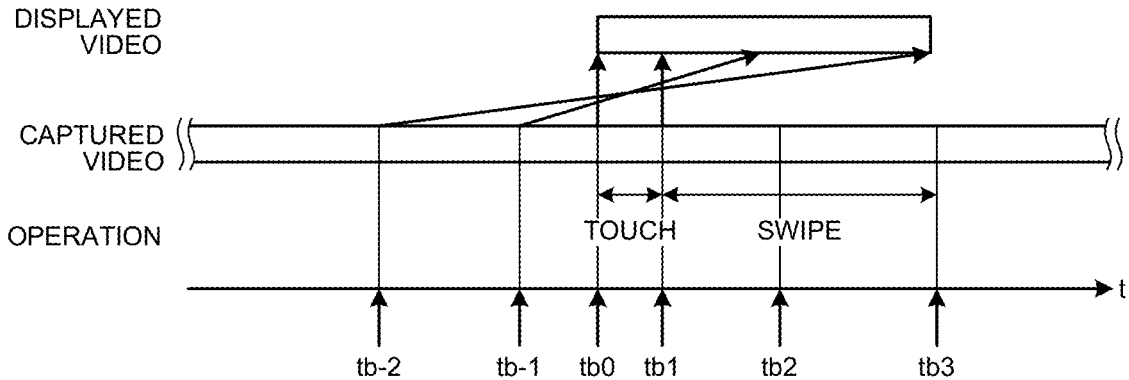
FIG. 9 is a diagram illustrating another example of the relationship between operation and a displayed video in the first embodiment.

FIG. 9 is a diagram illustrating another example of a relationship between operation and a displayed video in the first embodiment. Even in FIG. 9, it is indicated that time goes in the rightward direction. In the example illustrated in FIG. 9, a state is illustrated in which the passenger starts touch operation at a time tb0 and does not move a finger that is performing the touch operation until a time tb1. The replay controller 27 replays a video that is being captured from the time tb0, and the display controller 28 displays the video on the transparent display panel 14. Thereafter, the passenger performs swipe operation in the travelling direction of the vehicle from the time tb1 to a time tb3. The replay controller 27 replays the video in the reverse direction from the time tb1. The replay controller 27 replays the video during a period from the time tb1 to a time tb2, which is the same duration from the time tb0 to the time tb-2, in the reverse direction. The time tb2 indicates a time in a middle of the swipe operation. In the replay in the reverse direction, a portion that corresponds to the time tb2 is a portion at the time tb-1.

Effects

As described above, in the present embodiment, when the operation of the operation unit 15 is started, a video that is obtained at the start the operation of the operation unit 15 is displayed on the transparent display panel 14. In the present embodiment, when the operation unit 15 is operated such that the operation direction of the operation unit 15 is along the travelling direction of the vehicle, the video that is recorded in the recording controller 22 is replayed in the reverse direction from the video that is obtained at the start of the operation of the operation unit 15. According to the present embodiment, it is possible to immediately replay the video in the reverse direction based on operation. According to the present embodiment, the passenger of the vehicle is able to immediately check a situation, a facility, or the like in a location that is passed by the vehicle by travelling.

In the present embodiment, when the operation of the operation unit 15 is started, a video that is being captured from the start of the operation of the operation unit 15 is displayed on the transparent display panel 14. In the present embodiment, when the operation unit 15 is operated such that the operation direction of the operation unit 15 is along the travelling direction of the vehicle, the video that is recorded in the recording controller 22 is replayed in the reverse direction. According to the present embodiment, it is possible to immediately check a situation, a facility, or the like in a location that is passed by the vehicle by travelling from the image that is being captured.

In the present embodiment, a speed of replay of a video in the reverse direction is changed based on the operation speed when the operation unit 15 is operated such that the operation direction of the operation unit 15 is along the travelling direction of the vehicle. According to the present embodiment, it is possible to intuitively change the replay speed of the video in accordance with the operation speed.

In the present embodiment, the speed of replay of a video in the reverse direction is changed based on the travel speed of the vehicle at the start of the operation of the operation unit 15. According to the present embodiment, it is possible to appropriately change the replay speed in accordance with the travel speed of the vehicle.

Second Embodiment

Figure 10:
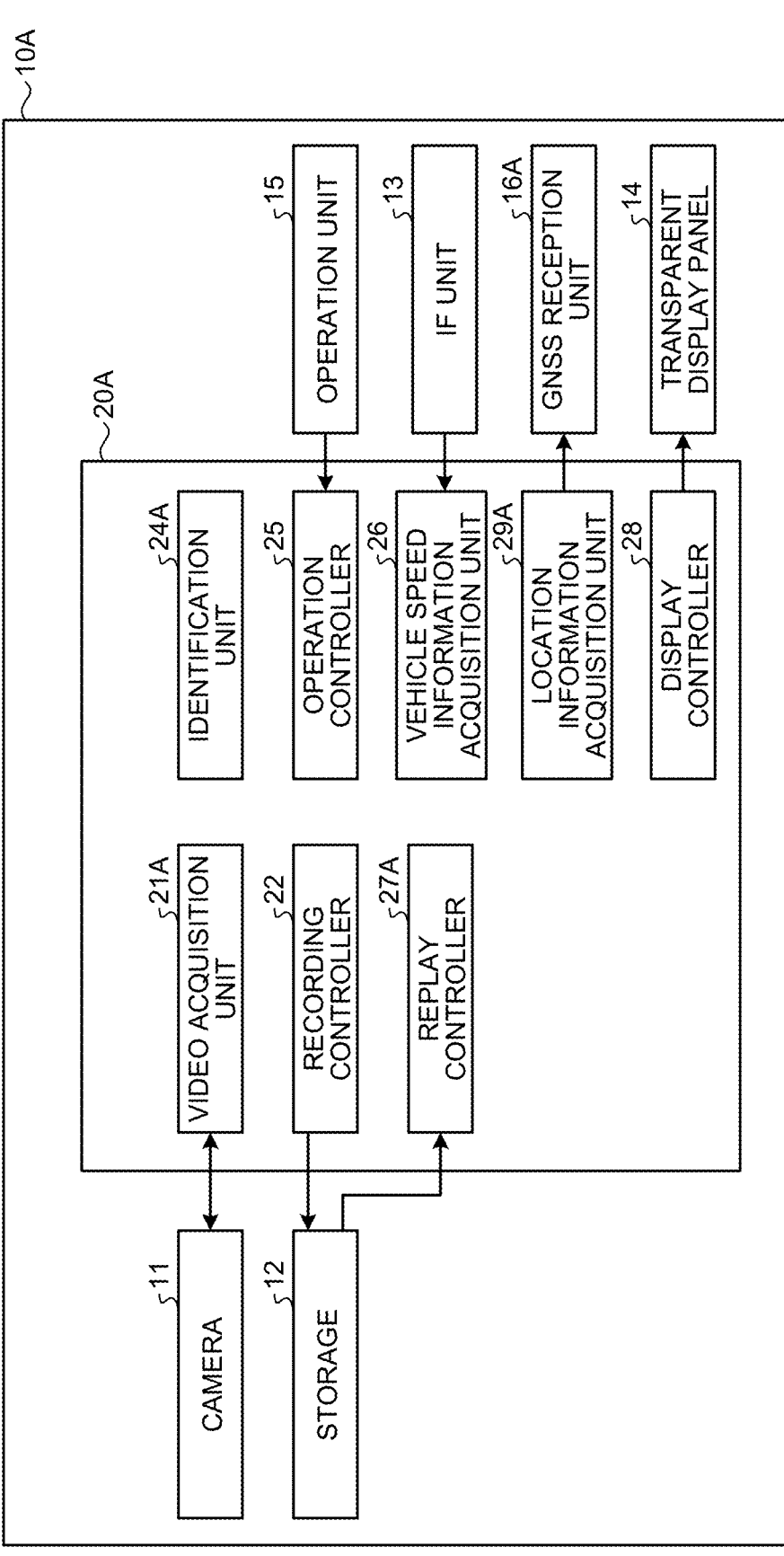
FIG. 10 is a block diagram illustrating a configuration example of a video display apparatus according to a second embodiment.
Figure 11:
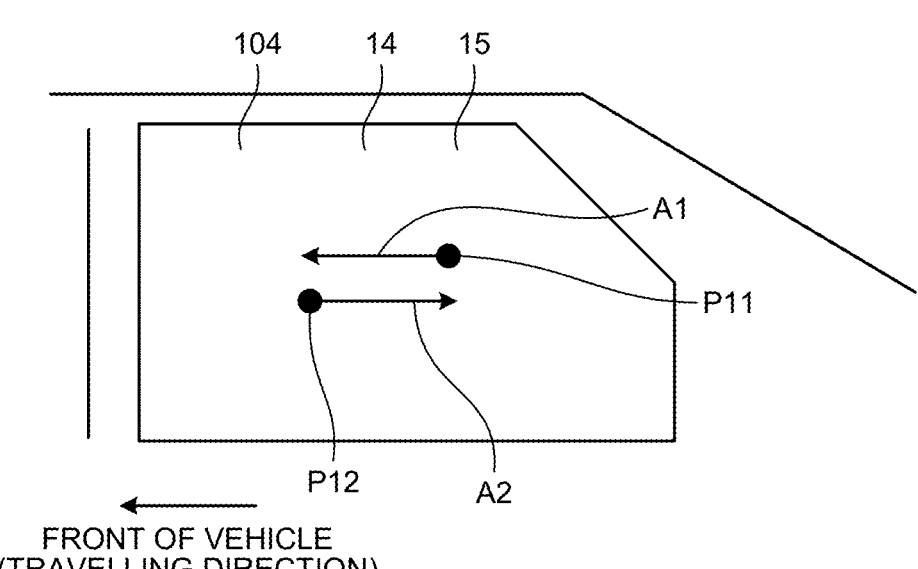
FIG. 11 is a schematic diagram for explaining an example of operation in an operation unit in the second embodiment.
Figure 12:
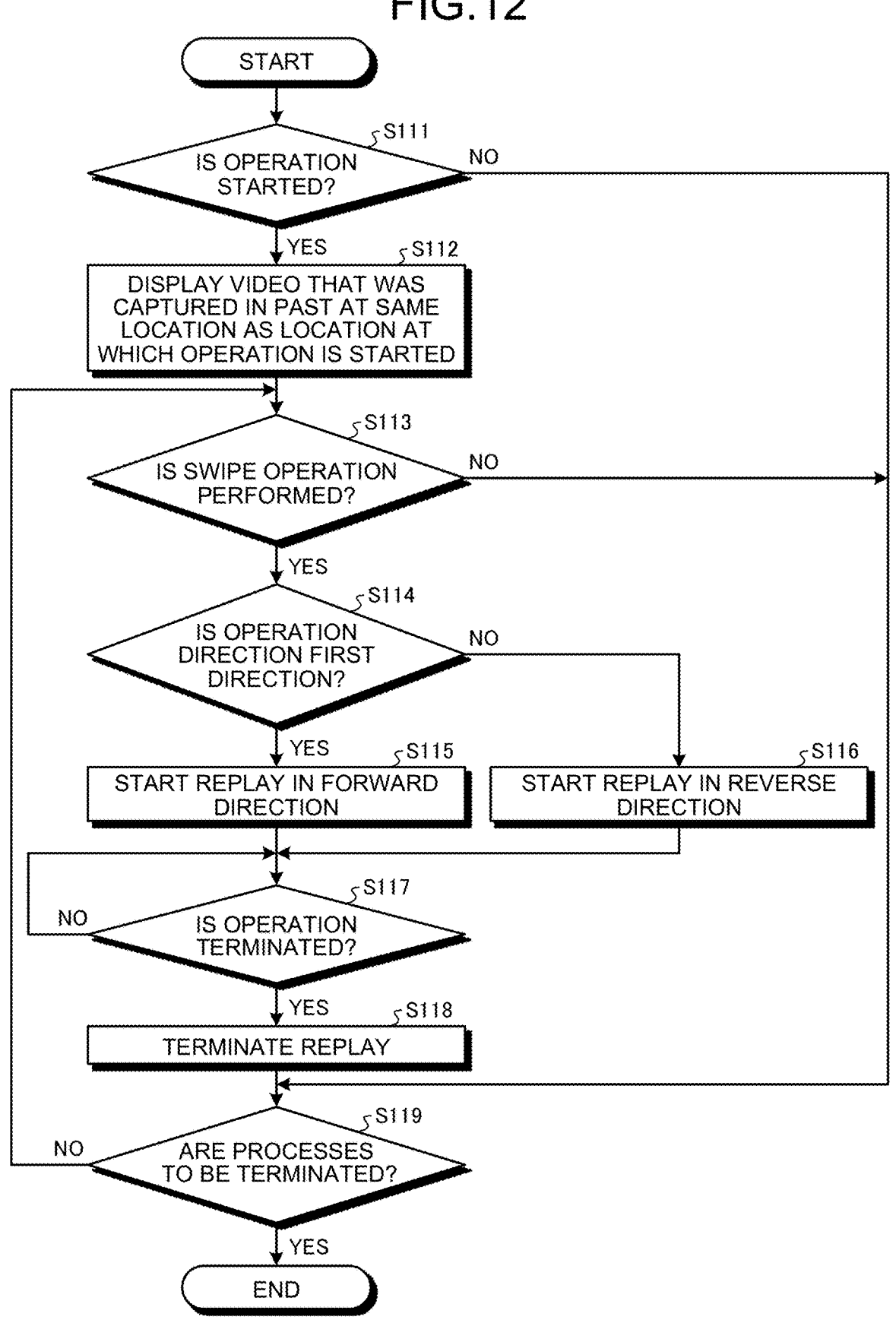
FIG. 12 is a flowchart illustrating an example of a flow of processes in a controller according to the second embodiment.
Figure 13:
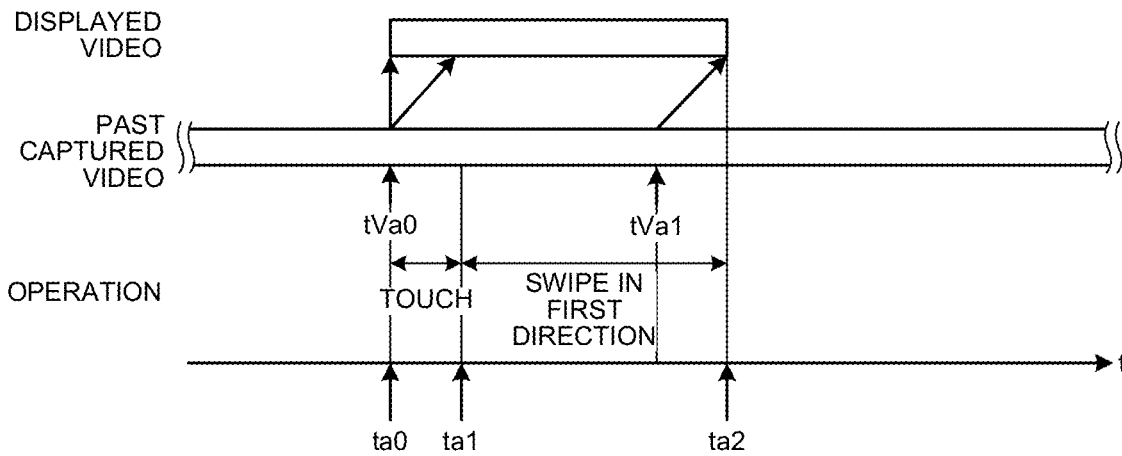
FIG. 13 is a diagram illustrating an example of a relationship between operation and a displayed video in the second embodiment.
Figure 14:
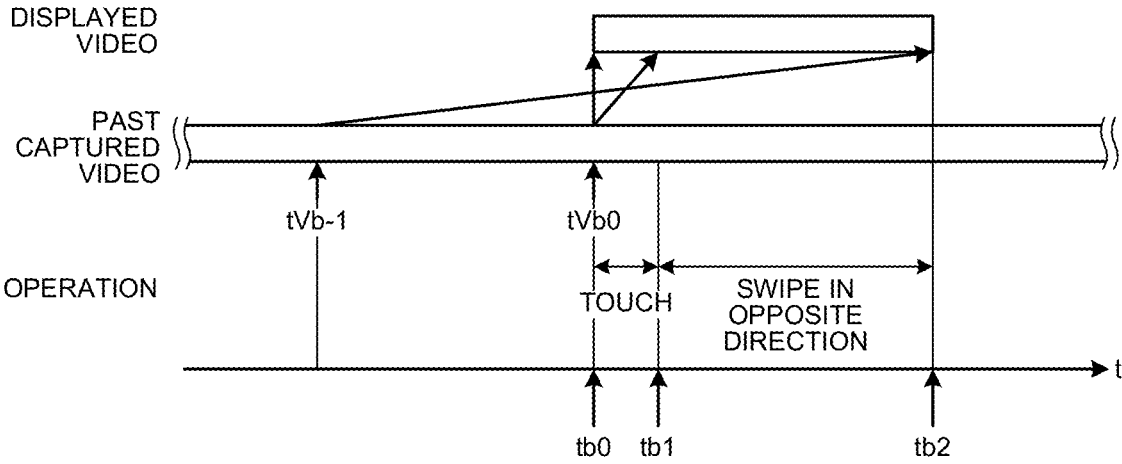
FIG. 14 is a diagram illustrating another example of the relationship between operation and a displayed video in the second embodiment.

A video display apparatus 10 according to a second embodiment will be described below with reference to FIG. 10 to FIG. 14. FIG. 10 is a block diagram illustrating a configuration example of the video display apparatus according to the second embodiment. FIG. 11 is a schematic diagram for explaining an example of operation in an operation unit of the second embodiment. FIG. 12 is a flowchart illustrating an example of a flow of processes in a controller according to the second embodiment. FIG. 13 is a diagram illustrating an example of a relationship between operation and a displayed video in the second embodiment. FIG. 14 is a diagram illustrating another example of the relationship between operation and a displayed video in the second embodiment.

The second embodiment addresses an issue that, when the passenger of the vehicle is viewing surroundings of the vehicle while the vehicle is traveling, it is difficult to immediately check a past situation of surroundings including a location in which the vehicle is traveling. An object of the present embodiment is to allow a passenger of a moving object to immediately check a past situation of surroundings including a location in which the moving object is moving.

In the present embodiment, a video display apparatus 10A displays a video that was captured in the past at the same location as the location of the vehicle on the transparent display panel 14. The video display apparatus 10A replays a video of surroundings of the vehicle in a forward direction or in a reverse direction in accordance with an operation direction, and displays the video on the transparent display panel 14.

A basic configuration of the video display apparatus 10A is the same as the video display apparatus 10 of the first embodiment. In the following description, the same components as those of the video display apparatus 10 are denoted by the same reference symbols or corresponding reference symbols, and detailed explanation thereof will be omitted. The second embodiment is different from the first embodiment in that a Global Navigation Satellite System (GNSS) reception unit 16A and a location information acquisition unit 29A are included and a video acquisition unit 21A, a recording controller 22A, an identification unit 24A, and a replay controller 27A perform different processes from the processes of the first embodiment.

The GNSS reception unit 16A is configured with a GNSS receiver or the like that receives GNSS signals from GNSS satellites. The GNSS reception unit 16A outputs the received location information signal to the location information acquisition unit 29A of the controller 20.

The location information acquisition unit 29A acquires location information that indicates a current location of the vehicle. The location information acquisition unit 29A calculates the location information on the current location of the vehicle by a well-known method, based on the GNSS signals that are received by the GNSS reception unit 16A.

The video acquisition unit 21A acquires a video that includes the location information on a location in which the video is captured.

The video acquisition unit 21A may acquire the video that is recorded in the storage 12.

The recording controller 22A records the video that is captured by the camera 11 in the storage 12 in association with an image capturing location. The recording controller 22A records the video that is captured by the camera 11 in the storage 12, together with the location information that is acquired by the location information acquisition unit 29A.

The identification unit 24A identifies a range that is to be displayed on the transparent display panel 14 in the video that is acquired by the video acquisition unit 21A.

The replay controller 27A replays the video that is acquired by the video acquisition unit 21A. The replay controller 27A performs replay in the forward direction or replay in the reverse direction in accordance with the operation direction of the operation unit 15.

The replay in the forward direction indicates replay of a past video of a location that is to be passed by the vehicle. The replay in the reverse direction indicate replay of a past video of a location through which the vehicle has already passed.

FIG. 11 is a schematic diagram for explaining an example of operation in the operation unit of the second embodiment. FIG. 11 illustrates the right rear door window glass 104 as one example. For example, the passenger performs swipe operation along a direction of an arrow A1 that is a first direction from an operation start point P11, as in what is called a seek bar. For example, the passenger performs swipe operation along a direction of an arrow A2 that is a second direction opposite to the first direction from an operation start point P12, as in what is called a seek bar.

When the operation of the operation unit 15 is started, the replay controller 27A causes the transparent display panel 14 to display a video that was captured in the past at the same location as the location of the vehicle at the start of the operation of the operation unit 15 and that is acquired by the video acquisition unit 21A, replays the video in the forward direction when the operation unit 15 is operated such that the operation direction of the operation unit 15 is in the first direction along the travelling direction of the vehicle, and replays the video in the reverse direction when the operation unit 15 is operated such that the operation direction of the operation unit 15 is in the direction opposite to the first direction along the travelling direction of the vehicle. The replay controller 27A replays a past video in the forward direction when, for example, swipe operation is performed in the first direction along the travelling direction of the vehicle. The replay controller 27A replays a past video in the reverse direction when, for example, swipe operation is performed in the direction opposite to the first direction along the travelling direction of the vehicle.

The replay controller 27A may replay a video that was captured in the past at the same location as the location of the vehicle at the start of the operation of the operation unit 15 and that was captured in the travelling direction.

The replay controller 27A may replay a video that was captured in the past by the camera 11 that corresponds to the window glass on which the operation unit 15 is arranged. For example, when the operation unit 15 of the right rear door window glass 104 is operated, the replay controller 27A may replay a video that was captured in the past by the camera 11 that captures an image of the right side of the vehicle.

When multiple of videos are present that are captured at the same location as the location of the vehicle at the start of the operation and that are captured in the travelling direction, the replay controller 27A may replay a video that is most recently captured.

When the swipe operation in the same direction is repeated, the replay controller 27A may replay multiple of videos that were captured in the past at the same location as the location of the vehicle at the start of the operation and that were captured in the travelling direction, such that an older video is replayed for each swipe operation.

When multiple of videos are present that were captured in the past at the same location as the location of the vehicle at the start of the operation and that were captured in the travelling direction, the replay controller 27A may replay a video that was captured before predetermined period, such as one year. In this case, when the swipe operation in the same direction is repeated, it may be possible to replay a video that was captured before another predetermined period, such as one more year, such that an older video is replayed for each swipe operation.

For example, in a case of swipe operation on a screen such as a smartphone, replay in the forward direction is performed when the swipe operation is performed from front to rear, in other words, in the first direction. When the swipe operation is performed from rear to front, in other words, in the direction opposite to the first direction, the replay in the reverse direction is performed.

The replay controller 27A may change the speed of replay of the video based on the operation speed when the operation unit 15 is operated such that the operation direction of the operation unit 15 is along the travelling direction of the vehicle. In the present embodiment, the replay controller 27A changes the speed of replay in the forward direction or replay in the reverse direction based on an operation amount of the swipe operation per unit time, in other words, the operation speed. For example, in a case of the operation speed of about 100 mm/sec, the replay controller 27A performs replay in the forward direction or replay in the reverse direction at 1× speed. For example, in a case of the operation speed of about 50 mm/sec, the replay controller 27A performs replay in the forward direction or replay in the reverse direction at 0.5× speed. For example, in a case of the operation speed of about 200 mm/sec, the replay controller 27A performs replay in the forward direction or replay in the reverse direction at 2× speed. The operation speed and the replay speed may be associated with each other in a linear manner or may be associated with each other in a stepwise manner.

The replay controller 27A may change the speed of replay of the video based on the travel speed of the vehicle at the start of the operation of the operation unit 15. The replay controller 27A may change the speed of replay of the video in the forward direction or the reverse direction in accordance with the travel speed of the vehicle at the start of the operation of the operation unit 15 based on the vehicle speed information that is acquired from the vehicle speed information acquisition unit 26. For example, when the travel speed of the vehicle at the start of the operation of the operation unit 15 is equal to or larger than 0 km/h and smaller than 20 km/h, the replay controller 27A performs replay in the forward direction or replay in the reverse direction at 0.5× speed. For example, when the travel speed of the vehicle at the start of the operation of the operation unit 15 is equal to or larger than 20 km/h and smaller than 60 km/h, the replay controller 27A performs replay in the forward direction or replay in the reverse direction at 1× speed. For example, when the travel speed of the vehicle at the start of the operation of the operation unit 15 is equal to or larger than 60 km/h, the replay controller 27A performs replay in the forward direction or replay in the reverse direction at 2× speed. The travel speed of the vehicle and the replay speed may be associated with each other in a linear manner or may be associated with each other in a stepwise manner.

A flow of processes performed by a controller 20A will be described below with reference to FIG. 12. Processes at Step S111 and Step S117 are the same as the processes at Step S102 and Step S106 in the flowchart illustrated in FIG. 7.

When it is determined that the operation is started (Yes at Step S111), the controller 20A displays a video that was captured in the past at the same location as the location at which the operation is started (Step S112). More specifically, the controller 20A causes the identification unit 24 to identify, from the video that was captured in the past, a range that is determined in advance as a range that is to be displayed on the transparent display panel 14. The controller 20A causes the replay controller 27A to replay a video that was captured in the past at the same location as the location of the vehicle at the start of the operation of the operation unit 15 and that is acquired by the video acquisition unit 21A. The controller 20A causes the display controller 28 to display the video on the transparent display panel 14 based on the control signal from the replay controller 27A. The controller 20A goes to Step S113.

The controller 20A determines whether or not swipe operation is performed (Step S113). More specifically, the controller 20A causes the operation controller 25 to determine that the swipe operation is performed when the swipe operation on the operation unit 15 is received. When the operation controller 25 determines that the swipe operation is performed (Yes at Step S113), the controller 20A goes to Step S114. When the operation controller 25 does not determine that the swipe operation is performed (No at Step S113), the process goes to Step S119.

When it is determined that the swipe operation is performed (Yes at Step S113), the controller 20A determines whether or not the operation direction is the first direction (Step S114). When it is determined that the operation direction of the swipe operation is the first direction (Yes at Step S114), the controller 20A goes to Step S115. When it is not determined that the operation direction of the swipe operation is the first direction (No at Step S114), the controller 20A goes to Step S116.

When it is determined that the operation direction is the first direction (Yes at Step S114), the controller 20A starts replay in the forward direction (Step S115). More specifically, the controller 20A causes the replay controller 27A to perform replay in the forward direction from the video that is obtained at the start of the operation of the operation unit 15. The controller 20A causes the display controller 28 to display the video on the transparent display panel 14 based on the control signal from the replay controller 27A. The controller 20A goes to Step S117.

When it is not determined that the operation direction is the first direction (No at Step S114), the controller 20A starts replay of the video in the reverse direction (Step S116). More specifically, the controller 20A causes the replay controller 27A to perform replay in the reverse direction from the video that is obtained at the start of the operation of the operation unit 15. The controller 20A causes the display controller 28 to display the video on the transparent display panel 14 based on the control signal from the replay controller 27A. The controller 20A goes to Step S117.

When it is determined that the operation is terminated (Yes at Step S117), the controller 20A terminates the replay (Step S118). More specifically, the controller 20A causes the replay controller 27A to terminate the replay of the video. The controller 20A causes the display controller 28 to terminate display of the video on the transparent display panel 14 based on the control signal from the replay controller 27A. The controller 20A goes to Step S119.

The controller 20A determines whether or not the processes are to be terminated (Step S119). For example, it is determined that the processes are to be terminated based on the fact that a power supply or power of the vehicle is turned off or the fact that termination operation is performed on the operation unit 15. When it is determined that the process is to be terminated (Yes at Step S119), the controller 20A terminates the processes. When it is not determined that the processes are to be terminated (No at Step S119), the controller 20A performs the process at Step S113 again.

FIG. 13 is a diagram illustrating an example of a process in a case where swipe is performed in the first direction along the travelling direction of the vehicle. FIG. 13 indicates that time goes in a rightward direction. The replay controller 27A acquires a video that was captured and recorded in the past and that includes the same location information as the location information on the vehicle at the time ta0 at which the touch operation is detected. In the example illustrated in FIG. 13, a state is illustrated in which the passenger starts touch operation at the time ta0 and does not move a finger that is performing the touch operation until the time ta1. The replay controller 27A replays, as a still image, a video at a time tVa0, which includes the same location information and the same travelling direction as those at the time ta0, in the past video, and the display controller 28 causes the transparent display panel 14 to display the video.

Thereafter, the passenger performs swipe operation in the travelling direction of the vehicle from the time ta1 to the time ta2. The replay controller 27A performs replay in the forward direction from the time tVa0, and replays the video from the time tVa0 to a time tVa1, which is the same duration from the time ta1 to the time ta2, in the forward direction.

At the time ta2 at which the swipe operation is terminated, the replay controller 27A terminates the replay and the display controller 28 terminates the display of the video. By termination of the display of the video, the transparent display panel 14 enters a transparent state.

After the finger is separated from the operation unit 15 at the time ta2 at which the swipe operation is terminated, the replay controller 27A may continue the replay in the forward direction for about one second, and thereafter the display controller 28 may terminate the display of the video, for example.

At the time ta2 at which the swipe operation is terminated, the display controller 28 may display the video that is obtained at the time tVa1 as a still image for about one second, and thereafter the display controller 28 may terminate the display of the video, for example.

When the swipe operation is performed again in the same direction after the time ta2, the replay controller 27A may further perform replay in the forward direction from the time tVa1.

FIG. 14 is a diagram illustrating an example of processes in a case where swipe is performed in a direction opposite to the travelling direction of the vehicle. Even in FIG. 14, it is indicated that time goes in the rightward direction. The replay controller 27A acquires a video that was captured and recorded in the past and that includes the same location information as the location information on the vehicle at the time tb0 at which the touch operation is detected. In the example illustrated in FIG. 14, the passenger starts touch operation at the time tb0 and does not move a finger that is performing the touch operation until the time tb1. The replay controller 27A replays, as a still image, a video at a time tVb0, which includes the same location information and the same travelling direction as those at the time tb0, in the past video, and the display controller 28 causes the transparent display panel 14 to display the video.

Thereafter, the passenger performs swipe operation in the direction opposite to the first direction along the travelling direction of the vehicle from the time tb1 to the time tb2. The replay controller 27A performs replay in the reverse direction from the time tVb0, and replays the video from the time tVb0 to a time tVb-1, which is the same duration from the time tb1 to the time tb2, in the reverse direction.

At the time tb2 at which the swipe operation is terminated, the replay controller 27A terminates the replay and the display controller 28 terminates the display of the video. By termination of the display of the video, the transparent display panel 14 enters a transparent state.

After the finger is separated from the operation unit 15 at the time tb2 at which the swipe operation is terminated, the replay controller 27A may continue the replay in the reverse direction for about one second, and thereafter the display controller 28 may terminate the display of the video, for example.

At the time tb2 at which the swipe operation is terminated, the display controller 28 may display the video that is obtained at the time tVb-1 as a still image for about one second, and thereafter the display controller 28 may terminate the display of the video, for example.

When the swipe operation is performed again in the same direction after the time tb2, the replay controller 27A may further perform replay in the reverse direction from the time tVb-1.

As described above, in the present embodiment, when the operation of the operation unit 15 is started, the video that was captured in the past at the same location as the location of the vehicle at the start of the operation of the operation unit 15 and that is acquired by the video acquisition unit 21A is displayed on the transparent display panel 14. In the present embodiment, when the operation unit 15 is operated such that the operation direction of the operation unit 15 is in the first direction along the travelling direction of the vehicle, the video is replayed in the forward direction, and, when the operation direction of the operation unit 15 is operated in the direction opposite to the first direction along the travelling direction of the vehicle, the video is replayed in the reverse direction. According to the present embodiment, it is possible to immediately replay the video in the reverse direction or in the forward direction in accordance with the operation direction. According to the present embodiment, it is possible to allow the passenger of the vehicle to immediately check a past situation of surroundings including a location in which the vehicle is traveling.

In the present embodiment, the video that is captured by the camera 11 is recorded in the storage 12, together with the location information. According to the present embodiment, it is possible to easily acquire a past video of surroundings including a location in which the vehicle is traveling.

In the present embodiment, the speed of replay of a video is changed based on the operation speed when the operation unit 15 is operated such that the operation direction of the operation unit 15 is along the travelling direction of the vehicle or the travel speed of the vehicle at the start of the operation of the operation unit 15. According to the present embodiment, it is possible to intuitively change the replay speed of the video in accordance with the operation speed.

Third Embodiment

Figure 15:
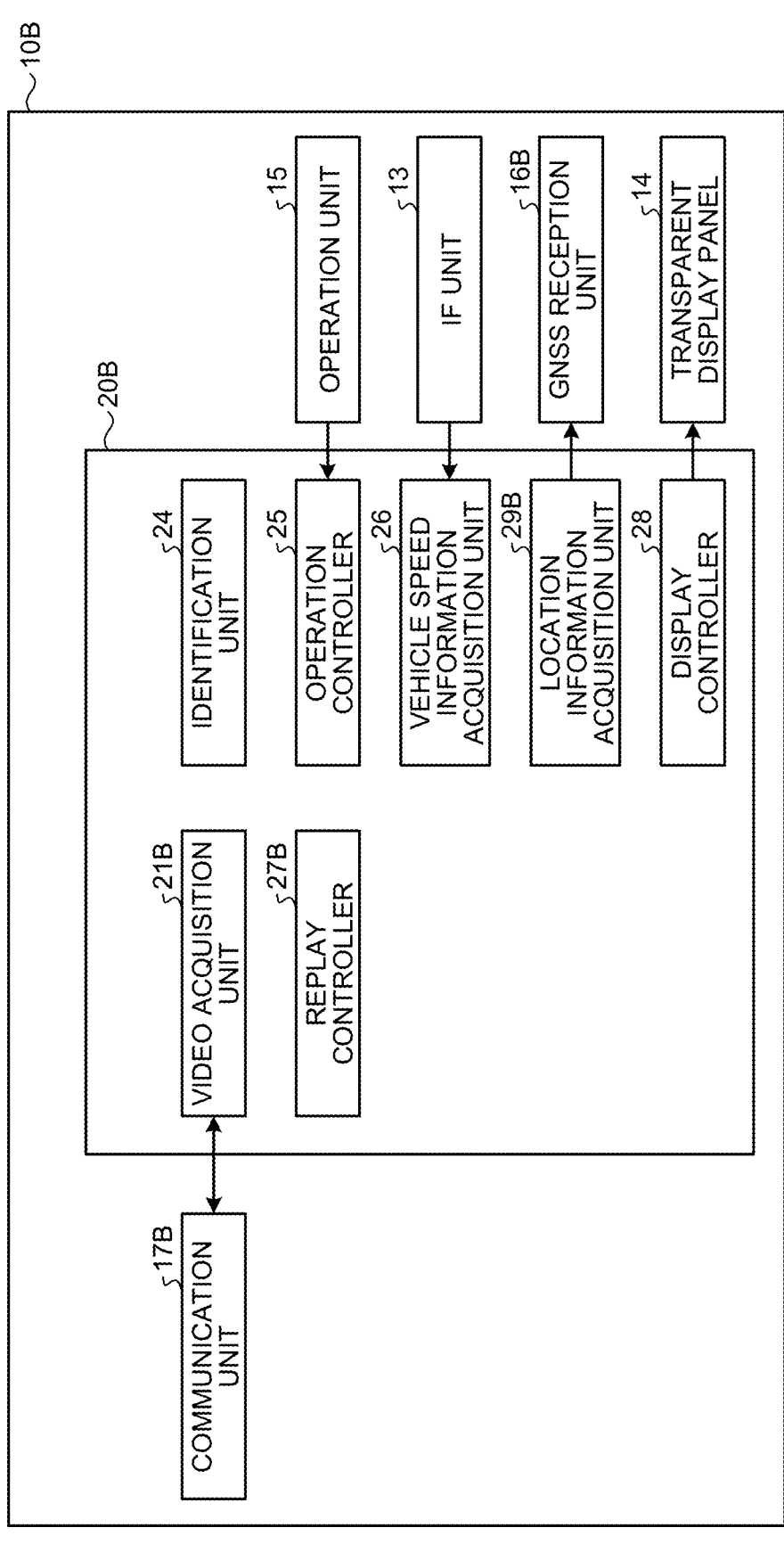
FIG. 15 is a block diagram illustrating a configuration example of a video display apparatus according to a third embodiment.

A video display apparatus 10 according to a third embodiment will be described below with reference to FIG. 15. FIG. 15 is a block diagram illustrating a configuration example of a video display apparatus according to the third embodiment. A video display apparatus 10B displays, on the transparent display panel 14, a past video that was captured by a different vehicle and that is accumulated in an external server. A basic configuration of the video display apparatus 10B is the same as the video display apparatus 10A of the second embodiment. The third embodiment is different from the second embodiment in that a communication unit 17B is included and a video acquisition unit 21B performs different processes.

A video that is captured by a camera (not illustrated) that is mounted on a different vehicle is accumulated in an external server (not illustrated) via a communication unit (not illustrated) of the different vehicle, together with information on an image capturing time, location information, information indicating a travelling direction, or the like.

The external server accumulates videos that are captured by cameras that are mounted on multiple vehicles. The external server transmits the accumulated videos to the video display apparatus 10B in accordance with a video acquisition request from the video display apparatus 10B that is mounted on each of the vehicles. More specifically, the external server receives, from the video display apparatus 10B of the vehicle, the video acquisition request and information that indicates a current location and a travelling direction of the vehicle. The external server detects, from the accumulated videos that were captured in the past by the different vehicle, a video that includes the same location as the received current location of the vehicle and the same travelling direction as the received travelling direction of the vehicle. When multiple videos are detected, for example, the external server selects a video in accordance with a predetermined condition, such as the latest video or a video that is captured before a predetermined period. Further, the external server transmits the detected video to the video display apparatus 10B.

The communication unit 17B is a communication unit. The communication unit 17B may perform communication by any method, such as the Internet or a mobile phone line. The communication unit 17B connects to the external server via a communication network (not illustrated) such that data communication is enabled. The communication unit 17B receives, from the external server, the video that is captured by the different vehicle.

The video acquisition unit 21B acquires the video that is captured by the different vehicle. When the operation of the operation unit 15 is started, the video acquisition unit 21B transmits the current location information on the own vehicle and the information that indicates the travelling direction to the external server, together with the video acquisition request, by using communication by the communication unit 17B. The video acquisition unit 21B acquires, from the external server, the video that was captured in the past by the different vehicle, that includes the same location as the current location, and that corresponds to the same travelling direction.

A replay controller 27B replays the video, which is acquired from the external server by the communication unit 17B and which is acquired by the video acquisition unit 21B, in accordance with the operation direction of the operation unit 15. Processes performed by a controller 20B in the present embodiment is processes in which the video that is replayed in the processes of the second embodiment as illustrated in FIG. 12 is replaced with a video that was captured in the past by the different vehicle at the same location as the location at which the operation is started. Further, in FIG. 13 and FIG. 14, the past video that was captured by the different vehicle at the same location as the location at which the operation is started is adopted as a displayed video.

As described above, in the present embodiment, it is possible to immediately check a past situation of surroundings including a location in which the vehicle is traveling, by using the video that is captured by a different moving object.

Fourth Embodiment

Figure 16:
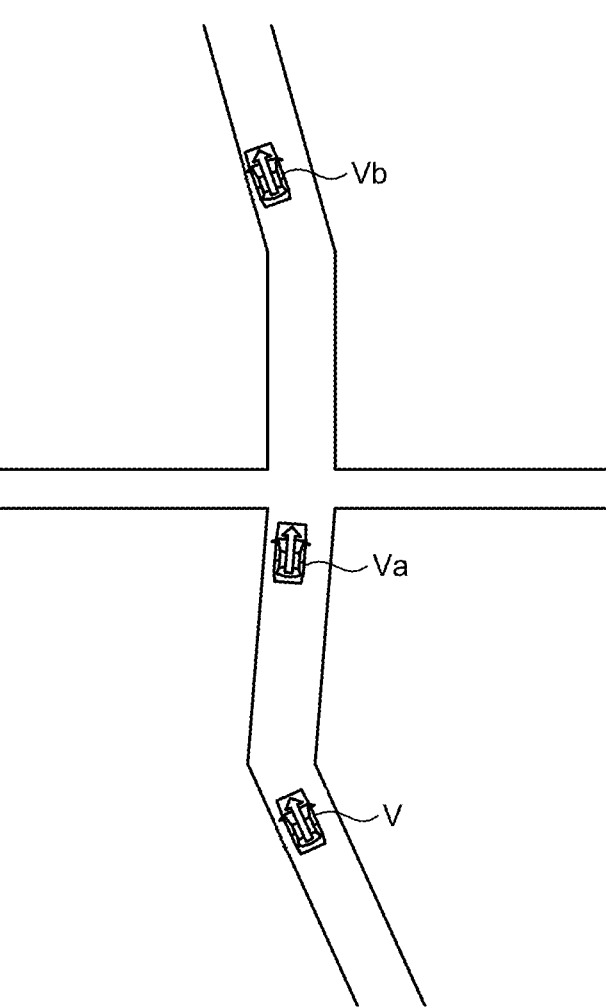
FIG. 16 is a diagram for explaining a relative positional relationship between an own vehicle and a different vehicle.
Figure 17:
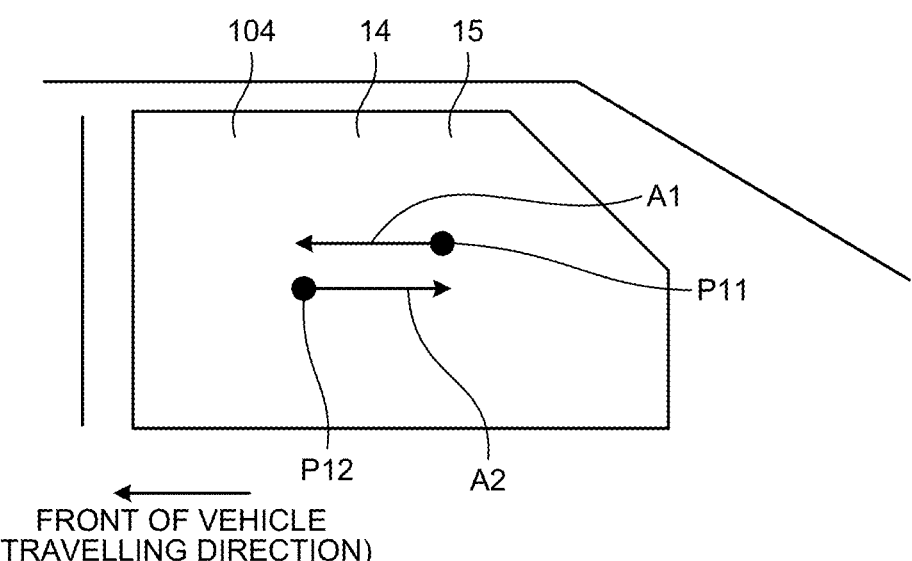
FIG. 17 is a schematic diagram for explaining an example of operation in an operation unit in a fourth embodiment.
Figure 19:
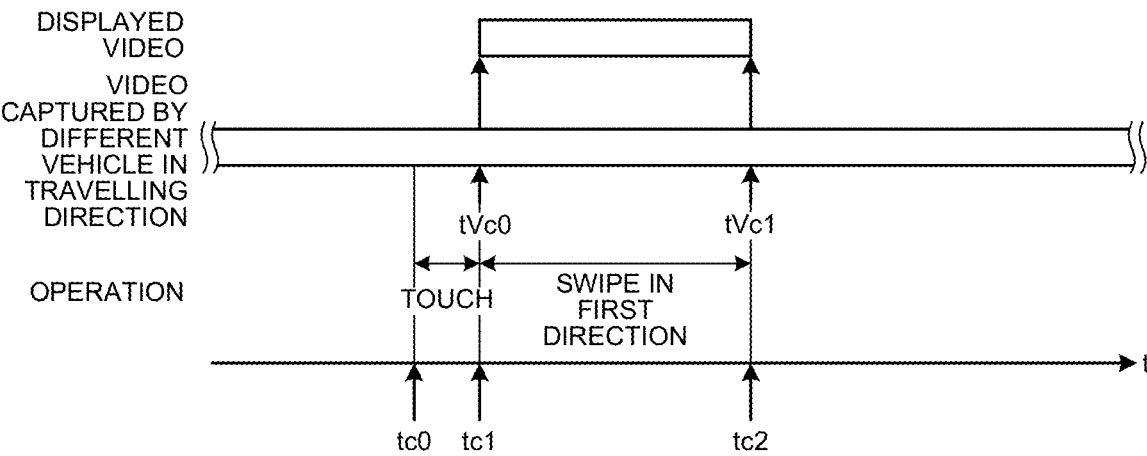
FIG. 19 is a diagram illustrating an example of a relationship between operation and a displayed video in the fourth embodiment.
Figure 20:
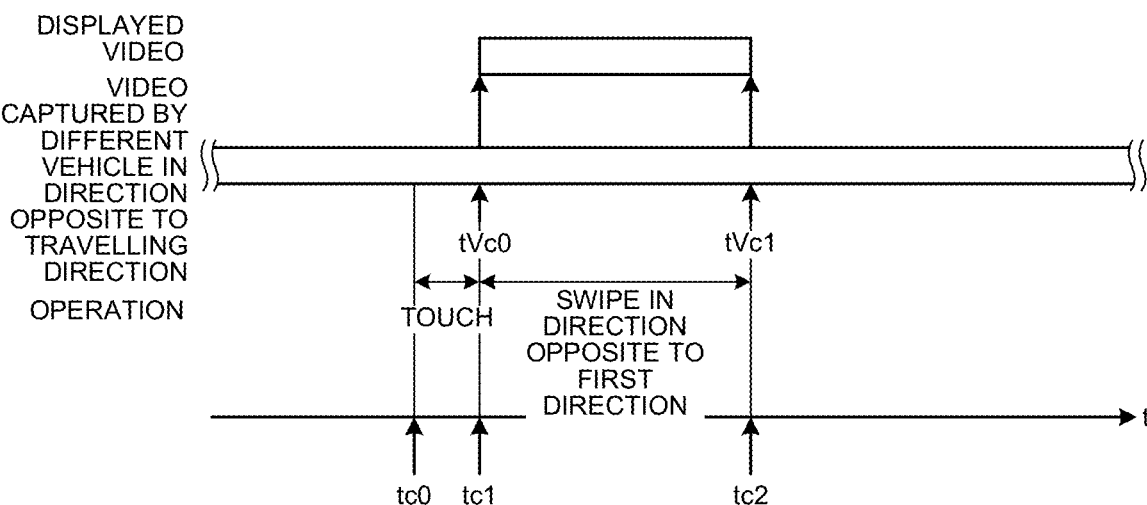
FIG. 20 is a diagram illustrating another example of the relationship between operation and a displayed video in the fourth embodiment.

A video display apparatus 10B according to a fourth embodiment will be described below with reference to FIG. 16 to FIG. 20. FIG. 16 is a diagram for explaining a relative positional relationship between an own vehicle and different vehicles. FIG. 17 is a schematic diagram for explaining an example of operation in an operation unit of the fourth embodiment. FIG. 18 is a flowchart illustrating an example of a flow of processes in a controller according to the fourth embodiment. FIG. 19 is a diagram illustrating an example of a relationship between operation and a displayed video in the fourth embodiment. FIG. 20 is a diagram illustrating another example of the relationship between operation and a displayed video in the fourth embodiment.

The fourth embodiment addresses an issue that, when a passenger of a moving object is viewing surroundings of the moving object while the moving object is moving, it is difficult to immediately check a current situation of a location that is passed by the moving object by moving or a current situation of a location that is to be passed. An object of the present embodiment is to allow a passenger of a moving object to immediately check a current situation of the location that is passed by the moving object by moving or a current situation of a location that is to be passed while viewing surroundings of the moving object during movement by the moving object.

In the present embodiment, the video display apparatus 10B replays a video that is being captured by a different vehicle that is located in the travelling direction of the vehicle or a video that is being captured by a different vehicle that is located in the direction opposite to the travelling direction of the vehicle, in accordance with the operation direction, and displays the video on the transparent display panel 14. A basic configuration of the video display apparatus 10B is the same as the video display apparatus 10B of the third embodiment. The fourth embodiment is different from the third embodiment in that the video acquisition unit 21B and the replay controller 27B perform different processes.

The external server acquires videos that are captured by cameras that are mounted on multiple of vehicles. The external server transmits the acquired videos to the video display apparatus 10B in accordance with a video acquisition request from the video display apparatus 10B that is mounted on each of the vehicles. More specifically, the external server receives, from the video display apparatus 10B of the vehicle, the video acquisition request and information that indicates a current location and a travelling direction of the vehicle. The external server detects, from the accumulated videos that are captured by the different vehicle, a different vehicle which is travelling on the same rode within a predetermined range from the received current location and which can transmit the video. Further, the external server detects a video from the detected different vehicle. Furthermore, the external server transmits the detected video to the video display apparatus 10B.

The video acquisition unit 21B may acquire a video that is being captured by a different vehicle that is located in the travelling direction of the vehicle or in the direction opposite to the travelling direction when operation of the operation unit 15 is performed.

The video acquisition unit 21B acquires, from a different vehicle that is travelling around the vehicle, a video in which surroundings of the different vehicle are captured and which includes the location information. The video acquisition unit 21B communicates with the external server by using wireless communication by the communication unit 17B, and acquires the video that is being captured by the different vehicle. The video acquisition unit 21B starts to acquire the video that is being captured by the different vehicle that is travelling around the vehicle, when the operation of the operation unit 15 is started.

The video acquisition unit 21B may acquire a video from a different vehicle that is located far from the own vehicle in accordance with the number of times of operation of the operation unit 15. The video acquisition unit 21B may acquire a video captured by the different vehicles, from the nearest different vehicle to the farthest different vehicle from the own vehicle one by one every time the operation unit 15 is operated, for example.

The video acquisition unit 21B may acquire a video from a different vehicle that is located at a longer distance from the own vehicle as an operation amount or an operation speed of the operation unit 15 increases. The video acquisition unit 21B may acquire and replay a video from a different vehicle that is located at a longer distance from the own vehicle based on, for example, an operation amount of the swipe operation per unit time, in other words, an operation speed. For example, in a case of the operation speed of smaller than 100 mm/sec, the video acquisition unit 21B acquires and replays a video from the closest different vehicle or a different vehicle that is located within 100 meters (m). For example, in a case of the operation speed of equal to or larger than 100 mm/sec, the video acquisition unit 21B acquires and replays a video from the second closest different vehicle or a different vehicle that is located within a range equal to or larger than 100 m and smaller than 200 m.

The video acquisition unit 21B may acquire a video from a different vehicle that is located at a longer distance from the vehicle as the travel speed of the vehicle at the start of the operation of the operation unit 15 increases. For example, when the travel speed of the vehicle at the start of the operation of the operation unit 15 is equal to or larger than 0 km/h and smaller than 20 km/h, the video acquisition unit 21B acquires a video from the closest different vehicle or a different vehicle that is located within 100 m. For example, when the travel speed of the vehicle at the start of the operation of the operation unit 15 is equal to or larger than 20 km/h and smaller than 60 km/h, the video acquisition unit 21B acquires a video from the second closest different vehicle or a different vehicle that is located within a range equal to or larger than 100 m and smaller than 200 m. When the travel speed of the vehicle at the start of the operation of the operation unit 15 is equal to or larger than 60 km/h, the video acquisition unit 21B acquires a video from the third closest different vehicle or a different vehicle that is located within a range equal to or larger than 200 m and smaller than 500 m.

The replay controller 27B replays a video that is being captured by a different vehicle that is located in the travelling direction of the vehicle when the operation unit 15 is operated such that the operation direction of the operation unit 15 is in the first direction along the travelling direction of the vehicle, and replays a video that is being captured by a different vehicle that is located in the direction opposite to the travelling direction of the vehicle when the operation unit 15 is operated such that the operation direction of the operation unit 15 is operated in the direction opposite to the first direction along the travelling direction of the vehicle.

The replay controller 27B replays a video that is acquired from a different vehicle located ahead of the vehicle or a video that is acquired from a different vehicle located behind the vehicle, in accordance with the operation direction of the operation unit 15. Replay of the video that is acquired from a different vehicle located ahead is to replay a video of a location that is to be passed by travelling. Replay of the video that is acquired from a different vehicle located behind is to replay a video of a location that has been passed by the vehicle and that indicates a situation after passing.

For example, when operation is performed from front to back as in what is called a seek bar, the video that is acquired from the different vehicle located ahead is replayed, and, when operation is performed from back to front, the video that is acquired from the different vehicle that is located behind is replayed.

For example, when swipe operation is performed from front to back as in a screen of a smartphone, that is, when the swipe operation is performed in the first direction, the video that is acquired from the different vehicle located ahead is replayed, and, when swipe operation is performed from back to front, that is, when the swipe operation is performed in the direction opposite to the first direction, the video that is acquired from the different vehicle that is located behind is replayed.

FIG. 17 illustrates the right rear door window glass 104 as one example. For example, the passenger performs swipe operation along the direction of the arrow A1 that is the first direction from the operation start point P11, as in what is called a seek bar. For example, the passenger performs swipe operation along the direction of the arrow A2 that is the second direction opposite to the first direction from the operation start point P12, as in what is called a seek bar.

When the swipe operation is performed again in the same direction, the replay controller 27B acquires and replays a video from a different vehicle that is located at a longer distance from the own vehicle than a different vehicle whose video has been replayed in a period from a time tVc0 to a time tVc1. For example, the replay controller 27B replays a video that is being captured by a different vehicle Va in response to the first swipe operation, and replays a video that is being captured by a different vehicle Vb in response to the second swipe operation. The different vehicle Va and the different vehicle Vb are travelling on the same road and in the same direction as those of the own vehicle V. A distance from a different vehicle from which a video can be acquired may be limited. For example, it may be possible to adopt a different vehicle located within 1 kilometers (km) from the own vehicle.

The replay controller 27B may acquire a video from a different vehicle that is located at a longer distance from the vehicle as an operation amount or an operation speed of the operation unit 15 increases. The replay controller 27B may acquire and replay a video from a different vehicle that is located at a longer distance from the own vehicle based on, for example, an operation amount of the swipe operation per unit time, in other words, an operation speed. For example, in a case of the operation speed of smaller than 100 mm/sec, the replay controller 27B replays a video from the closest different vehicle or a different vehicle that is located within 100 m. For example, in a case of the operation speed of equal to or larger than 100 mm/sec, the replay controller 27B replays a video from the second closest different vehicle or a different vehicle that is located within a range equal to or larger than 100 m and smaller than 200 m.

The replay controller 27B acquires and replays a video from a different vehicle that is located at a longer distance from the own vehicle, in accordance with the travel speed of the vehicle at the start of the operation of the operation unit 15, based on the vehicle speed information that is acquired by the vehicle speed information acquisition unit 26. For example, when the travel speed of the vehicle at the start of the operation of the operation unit 15 is equal to or larger than 0 km/h and smaller than 20 km/h, the replay controller 27B replays a video from the closest different vehicle or a different vehicle that is located within 100 m. For example, when the travel speed of the vehicle at the start of the operation of the operation unit 15 is equal to or larger than 20 km/h and smaller than 60 km/h, the replay controller 27B replays a video from the second closest different vehicle or a different vehicle that is located within a range equal to or larger than 100 m and smaller than 200 m. When the travel speed of the vehicle at the start of the operation of the operation unit 15 is equal to or larger than 60 km/h, the replay controller 27B replays a video from the third closest different vehicle or a different vehicle that is located within a range equal to or larger than 200 m and smaller than 500 m.

A flow of processes performed by the controller 20 will be described below with reference to FIG. 18. Processes at Step S121, Step S123, Step S124, and Step S127 to Step S129 are the same as the processes at Step S111, Step S113, Step S114, and Step S117 to Step S119 in the flowchart illustrated in FIG. 12.

When it is determined that the operation is started (Yes at Step S121), the controller 20B requests the external server to acquire a video that is being captured by a different vehicle that is travelling around the own vehicle (Step S122). More specifically, the controller 20B causes the video acquisition unit 21B to allow the external server to acquire a video in which surroundings of a different vehicle that is travelling around the own vehicle are captured and which includes the location information. The controller 20B goes to Step S123.

When it is determined that the operation direction is the first direction (Yes at Step S124), a video that is being captured by a different vehicle located in the travelling direction is acquired, and replay of the video is started (Step S125). More specifically, the controller 20B causes the video acquisition unit 21B to acquire the video that is being captured by the different vehicle located in the travelling direction. The controller 20B causes the identification unit 24 to identify a range that is determined in advance as a range that is to be displayed on the transparent display panel 14, from the video that is being captured by the different vehicle located in the travelling direction. The controller 20B causes the replay controller 27B to replay the video that is being captured by the different vehicle located in the travelling direction and that is acquired by the video acquisition unit 21B. The controller 20B causes the display controller 28 to display the video on the transparent display panel 14 based on the control signal from the replay controller 27B. The controller 20B goes to Step S127.

When it is not determined that the operation direction is the first direction (No at Step S124), a video that is being captured by a different vehicle located in a direction opposite to the travelling direction is acquired, and replay of the video is started (Step S126). More specifically, the controller 20B causes the video acquisition unit 21B to acquire the video that is being captured by the different vehicle located in the direction opposite to the travelling direction. The controller 20B causes the identification unit 24 to identify a range that is determined in advance as a range that is to be displayed on the transparent display panel 14, from the video that is being captured by the different vehicle located in the direction opposite to the travelling direction. The controller 20B causes the replay controller 27B to replay the video that is being captured by the different vehicle located in the direction opposite to the travelling direction and that is acquired by the video acquisition unit 21B. The controller 20B causes the display controller 28 to display the video on the transparent display panel 14 based on the control signal from the replay controller 27B. The controller 20B goes to Step S127.

FIG. 19 and FIG. 20 illustrate examples of processes at the time the operation unit 15 of the vehicle is operated. The video acquisition unit 21B requests the external server to acquire a video from the different vehicle that is travelling on the same road and in the same direction as those of the own vehicle around the own vehicle at a time tc0 at which touch operation is detected. In the examples illustrated in FIG. 19 and FIG. 20, the passenger starts the touch operation at the time tc0 and does not move a finger performing the touch operation until a time tc1. At the time tc0, the replay controller 27B does not select and replay a video for which the acquisition request is issued.

In the example illustrated in FIG. 19, the passenger performs swipe operation in the first direction that is the travelling direction of the vehicle during a period from the time tc1 to a time tc2. The replay controller 27B selects a video that is acquired from a different vehicle that is located in the travelling direction, performs replay in the forward direction from the time tc1, and replays a video from a time tVc0 to the time tVc1, which is the same duration from the time tc1 to the time tc2.

In the example illustrated in FIG. 20, the passenger performs swipe operation in the direction opposite to the first direction that is the travelling direction of the vehicle during a period from the time tc1 to the time tc2. The replay controller 27B selects a video that is acquired from the different vehicle that is located in the direction opposite to the travelling direction, performs replay in the forward direction from the time tc1, and replays a video from the time tVc0 to the time tVc1, which is the same duration from the time tc1 to the time tc2.

In the example illustrated in FIG. 19 and FIG. 20, at the time tc2 at which the swipe operation is terminated, the display controller 28 terminates the display of the video. By termination of the display of the video, the transparent display panel 14 enters a transparent state.

In the example illustrated in FIG. 19 and FIG. 20, after the finger is separated from the operation unit 15 at the time tc2 at which the swipe operation is terminated, the replay controller 27B may continue the replay that is acquired from the different vehicle for about one second, and thereafter the display controller 28 may terminate the display of the video, for example.

In the example illustrated in FIG. 19 and FIG. 20, at the time tc2 at which the swipe operation is terminated, the display controller 28 may display the video that is obtained at the time tVc1 as a still image for about one second, and thereafter the display controller 28 may terminate the display of the video, for example.

As described above, in the present embodiment, when the operation unit 15 is operated such that the operation direction of the operation unit 15 is in the first direction along the travelling direction of the vehicle, a video that is being captured by a different vehicle that is located in the travelling direction of the vehicle is replayed, and, when the operation unit 15 is operated such that the operation direction of the operation unit 15 is in the direction opposite to the first direction along the travelling direction of the vehicle, a video that is being captured by a different vehicle that is located in the direction opposite to the travelling direction of the vehicle is replayed. According to the present embodiment, when a passenger of a vehicle is viewing surroundings of the vehicle while the vehicle is travelling, it is possible to immediately check a current situation of a location that is passed by the vehicle by travelling or a current situation of a location that is to be passed.

In the present embodiment, it is possible to acquire a video from a different vehicle that is located far from the vehicle in accordance with the number of times of operation of the operation unit 15.

In the present embodiment, it is possible to acquire a video from a different vehicle that is located at a longer distance from the vehicle as the operation amount or the operation speed of the operation unit 15 increases.

In the present embodiment, it is possible to acquire a video from a different vehicle that is located at a longer distance from the vehicle as the moving speed of the vehicle at the start of the operation of the operation unit 15 increases.

The video display apparatus 10 according to the present disclosure may be embodied in various different forms other than the embodiments as described above.

The components of the video display apparatus 10 illustrated in the drawings are functionally conceptual and do not necessarily have to be physically configured in the manner illustrated in the drawings. In other words, specific forms of the apparatuses are not limited to those illustrated in the drawings, and all or part of the apparatuses may be functionally or physically distributed or integrated in arbitrary units depending on various loads or use conditions.

The configuration of the video display apparatus 10 may be implemented as software by, for example, a program that is loaded on a memory. In the embodiments as described above, the functional blocks that are implemented by cooperation of hardware or software are described. In other words, the functional blocks may be implemented by various forms, such as by only hardware, by only software, or by a combination of hardware and software.

The components as described above include one that can easily be thought of by a person skilled in the art and one that is practically identical. Further, the components described above may be combined appropriately.

Furthermore, within the scope not departing from the gist of the embodiments described above, various omission, replacement, and modifications of the components may be made.

Modifications

In the above description, touch operation, swipe operation, and flick operation on the operation unit 15 are described, but embodiments are not limited thereto. For example, it may be possible to capture an image of a motion of a hand that is located close to the transparent display panel 14 by an in-vehicle camera (for example, installed above each of the transparent display panels), and perform operation by a trajectory of the hand. In this case, embodiments may be applied to operation of bringing the hand closer to the transparent display panel 14 (start of operation) and moving the hand to an opposite side of the travelling direction of the vehicle. Alternatively, embodiments may be applied to gesture operation using a ring-shape device such as a smart ring.

In the fourth embodiment, it is appropriate to acquire a video in a form of streaming from the different vehicle, the external server, or the own vehicle, and the own vehicle does not record the video acquired from the different vehicle.

According to the present disclosure, it is possible to immediately check a video of a location that is passed by a vehicle by traveling.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A video display apparatus comprising:

an imager configured to capture a video of surroundings of a moving object;

a transparent display panel that is installed in a window glass of the moving object and that has transparency;

an identification unit configured to identify, from the video that is captured by the imager, a visible range in which a passenger views an outside of the moving object through the window glass as a range that is to be displayed on the transparent display panel;

an operation unit configured to be operable on a surface of the transparent display panel;

a recording controller configured to record the video that is captured by the imager in a storage;

a replay controller configured to replay the video that is recorded in the storage; and a display controller configured to cause the transparent display panel to display a video of the range that is identified by the identification unit in the video that is replayed by the replay controller, wherein when operation of the operation unit is started, the replay controller is further configured to cause the transparent display panel to display a video that is obtained at a start of the operation of the operation unit, when the operation unit is operated such that an operation direction of the operation unit is along a travelling direction of the moving object, the replay controller is further configured to replay, in a reverse direction, the video that is recorded by the recording controller from the video that is obtained at the start of the operation of the operation unit, when the operation of the operation unit is started, the replay controller is further configured to display, on the transparent display panel, a video that is being captured from the start of the operation of the operation unit, and when the operation unit is operated such that the operation direction of the operation unit is along the travelling direction of the moving object, the replay controller is further configured to replay, in the reverse direction, the video that is recorded by the recording controller.

2. The video display apparatus according to claim 1, wherein the replay controller is further configured to change a speed of replay of the video in the reverse direction based on an operation speed when the operation unit is operated such that the operation direction of the operation unit is along the travelling direction of the moving object.

3. The video display apparatus according to claim 1, wherein the replay controller is further configured to change a speed of replay of the video in the reverse direction based on a moving speed of the moving object at the start of the operation of the operation unit.

4. A video display apparatus comprising:

a video acquisition unit configured to acquire a video that includes location information on a location at which the video is captured;

a location information acquisition unit configured to acquire location information on a moving object;

27
28 a transparent display panel that is installed in a window glass of the moving object and that has transparency;

an operation unit configured to be operable on a surface of the transparent display panel;

an identification unit configured to identify, from the video that is acquired by the video acquisition unit, a visible range in which a passenger views an outside of the moving object through the window glass as a range that is to be displayed on the transparent display panel;

a replay controller configured to replay the video that is acquired by the video acquisition unit; and a display controller configured to cause the transparent display panel to display a video of the range that is identified by the identification unit in the video that is replayed by the replay controller, wherein when operation of the operation unit is started, the replay controller is further configured to cause the transparent display panel to display a video that was captured in a past at a same location as a location of the moving object at the start of the operation of the operation unit and that is acquired by the video acquisition unit and, when the operation unit is operated such that an operation direction of the operation unit is in a first direction along a travelling direction of the moving object, the replay controller is further configured to replay the video in a forward direction, and when the operation unit is operated such that the operation direction of the operation unit is along a direction opposite to the first direction along the travelling direction of the moving object, the replay controller is further configured to replay the video in a reverse direction.

5. The video display apparatus according to claim 4 further comprising:

an imager configured to capture a video of surroundings of the moving object; and a recording controller configured to record the video that is captured by the imager in a storage together with the location information that is acquired by the location information acquisition unit, wherein the video acquisition unit is further configured to acquire the video that is recorded in the storage.

6. The video display apparatus according to claim 4, wherein the video acquisition unit is further configured to acquire a video that is captured by a different moving object.

7. The video display apparatus according to claim 4, wherein the replay controller is further configured to change a speed of replay of the video based on an operation speed at which the operation unit is operated such that the operation direction of the operation unit is along the travelling direction of the moving object or a moving speed of the moving object at the start of the operation of the operation unit.

8. A video display apparatus comprising:

a location information acquisition unit configured to acquire location information on a moving object;

a transparent display panel that is installed in a window glass of the moving object and that has transparency;

a video acquisition unit configured to acquire, from a different moving object that is travelling around the moving object, a video in which surroundings of the different moving object are captured and which includes location information;

an identification unit configured to identify, from the video that is acquired by the video acquisition unit, a visible range in which a passenger views an outside of the moving object through the window glass as a range that is to be displayed on the transparent display panel;

an operation unit configured to be operable on a surface of the transparent display panel;

a replay controller configured to replay the video that is acquired by the video acquisition unit; and a display controller configured to cause the transparent display panel to display a video of the range that is identified by the identification unit in the video that is replayed by the replay controller, wherein when operation of the operation unit is started, the video acquisition unit is further configured to start to acquire a video that is being captured by the different moving object that is travelling around the moving object, when the operation unit is operated such that an operation direction of the operation unit is operated in a first direction along a travelling direction of the moving object, the replay controller is further configured to replay the video that is being captured by the different moving object located in the travelling direction of the moving object, and when the operation unit is operated such that the operation direction of the operation unit is along a direction opposite to the first direction along the travelling direction of the moving object, the replay controller is further configured to replay the video that is being captured by the different moving object located in the direction opposite to the travelling direction of the moving object.

9. The video display apparatus according to claim 8, wherein the video acquisition unit is further configured to acquire the video from the different moving object that is located far from the moving object in accordance with a number of times of operation of the operation unit.

10. The video display apparatus according to claim 8, wherein the video acquisition unit is further configured to acquire the video from the different moving object located at a longer distance from the moving object as an operation amount or an operation speed of the operation unit increases.

11. The video display apparatus according to claim 8, wherein the video acquisition unit is further configured to acquire the video from the different moving object located at a longer distance from the moving object as a moving speed of the moving object at the start of the operation of the operation unit increases.

* * * * *